(12) United States Patent
Inoue et al.

(10) Patent No.: US 11,371,579 B2
(45) Date of Patent: Jun. 28, 2022

(54) VARIABLE STIFFNESS BUSHING

(71) Applicant: HONDA MOTOR CO., LTD., Tokyo (JP)

(72) Inventors: Toshio Inoue, Wako (JP); Yuho Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 404 days.

(21) Appl. No.: 16/787,975

(22) Filed: Feb. 11, 2020

(65) Prior Publication Data
US 2020/0263756 A1 Aug. 20, 2020

(30) Foreign Application Priority Data
Feb. 15, 2019 (JP) ............................. JP2019-025095

(51) Int. Cl.
*F16F 13/14* (2006.01)

(52) U.S. Cl.
CPC ...... *F16F 13/1481* (2013.01); *F16F 2224/04* (2013.01); *F16F 2232/08* (2013.01)

(58) Field of Classification Search
CPC ............. F16F 13/1481; F16F 2224/04; F16F 2224/08; F16F 13/30; F16F 9/535
USPC ..................................................... 267/141.2
See application file for complete search history.

(56) References Cited

U.S. PATENT DOCUMENTS

| 5,050,850 A | 9/1991 | Noguchi et al. | |
| 5,165,669 A | 11/1992 | Mayerbock et al. | |
| 5,492,312 A * | 2/1996 | Carlson | B66B 7/044 188/267.2 |
| 2002/0020950 A1* | 2/2002 | Bouhier | F16F 13/18 267/140.13 |
| 2002/0036372 A1* | 3/2002 | Goto | F16F 13/268 267/136 |
| 2007/0246870 A1 | 10/2007 | Siemer et al. | |

(Continued)

FOREIGN PATENT DOCUMENTS

| CN | 104191927 A | 12/2014 |
| CN | 105799438 A * | 7/2016 |

(Continued)

OTHER PUBLICATIONS

China First Notification of Office Action for Application CN 202010086006.0 dated May 7, 2021; 21 pp.

*Primary Examiner* — Melanie Torres Williams
(74) *Attorney, Agent, or Firm* — Armstrong Teasdale LLP

(57) ABSTRACT

A variable stiffness bushing includes: inner and outer tubular members; and an elastic member connecting these tubular members. At least one pair of liquid chambers axially separated from each other is defined in the elastic member. The liquid chambers are connected by a communication passage including a circumferential passage provided in one of the inner and outer tubular members. The one of the inner and outer tubular members includes a coil wound coaxially therewith and a yoke provided with a gap constituting the circumferential passage. A magnetic fluid fills the liquid chambers and the communication passage. Upper and lower end walls and an axially intermediate partition wall of the elastic member are configured such that when the tubular members are axially displaced relative to each other, a difference is created between volumes of the axially separated liquid chambers.

10 Claims, 16 Drawing Sheets

(56) References Cited

U.S. PATENT DOCUMENTS

2012/0139173 A1    6/2012  Lee
2017/0291464 A1*  10/2017  Isaac ..................... F16F 13/305

FOREIGN PATENT DOCUMENTS

| | | | |
|---|---|---|---|
| DE | 60302837 T2 | 9/2006 | |
| DE | 10118229 B4 * | 3/2007 | ............. F16F 13/16 |
| EP | 1705400 A1 | 9/2006 | |
| JP | S63176844 A | 7/1988 | |
| JP | H023721 A | 1/1990 | |
| JP | H0674288 A | 3/1994 | |
| JP | 2008025755 A | 2/2008 | |
| KR | 20030013719 A | 2/2003 | |
| WO | WO-2005059399 A1 * | 6/2005 | ......... F16F 13/1463 |

\* cited by examiner

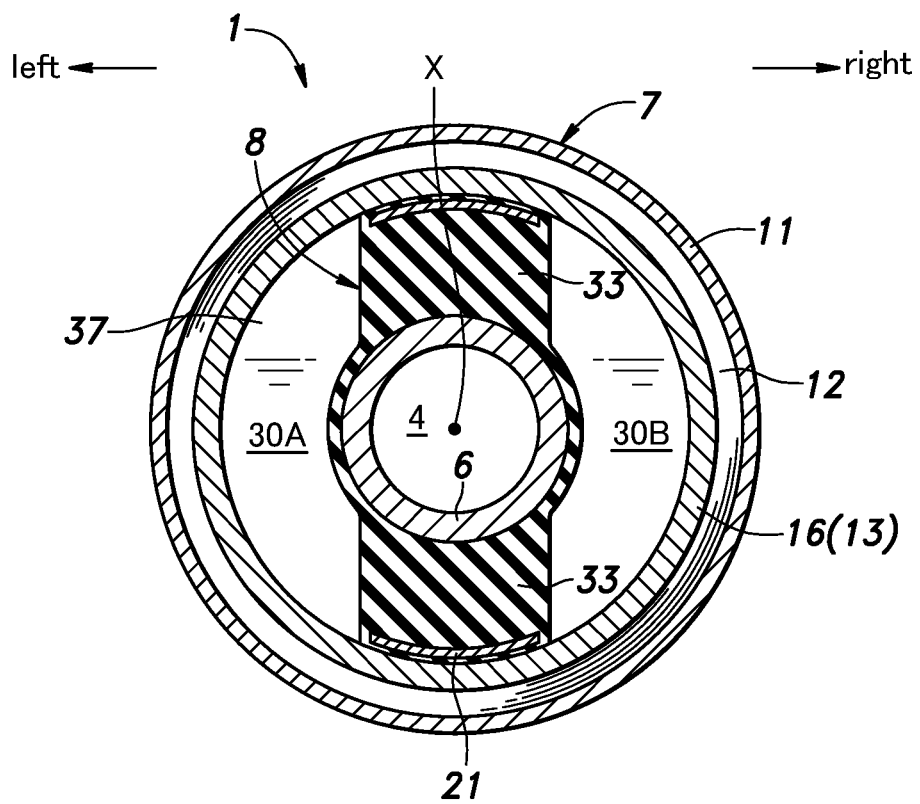

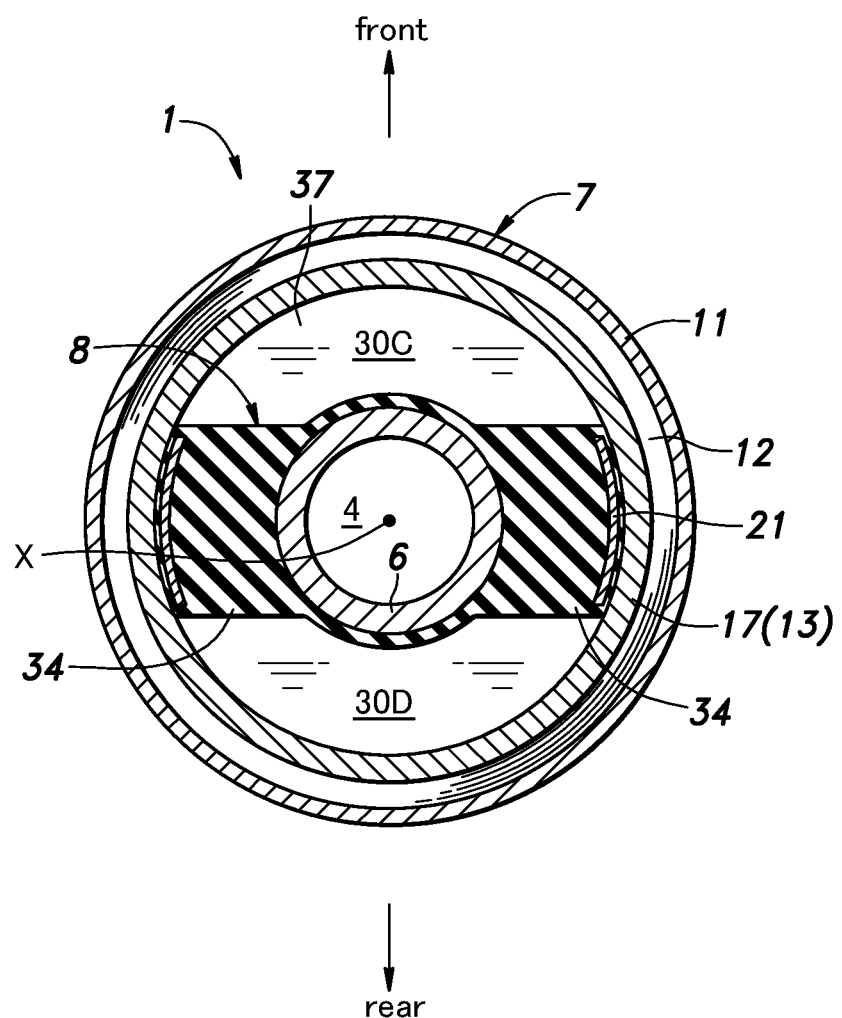

VARIABLE STIFFNESS BUSHING

TECHNICAL FIELD

The present invention relates to a variable stiffness bushing.

BACKGROUND ART

As a cylindrical liquid filled mount (bushing), there is known a liquid filled mount configured to damp vibrations not only in the direction orthogonal to the axial direction but also in directions other than the direction orthogonal to the axial direction, particularly in the tube axis direction, by using the flow resistance of the liquid (see JPH6-74288A, for example).

The liquid filled mount disclosed in JPH6-74288A includes an inner tubular member, an outer tubular member, an elastic member connecting the inner and outer tubular members, a pair of liquid chambers defined on respective sides of the inner tubular member with respect to the direction orthogonal to the tube axis, a filling liquid, an orifice communicating the liquid chambers with each other, through-cavities extending through the elastic member in the tube axis direction at positions on respective sides with respect to the direction orthogonal to the tube axis, and a stopper protruding from an intermediate position of the inner tubular member to both sides with respect to the direction orthogonal to the tube axis. The elastic member includes partition wall parts that separate the respective through-cavities from the corresponding liquid chambers, and each partition wall is integrally formed with a covering part covering a corresponding tip end of the stopper, which protrudes through the partition wall part toward the corresponding liquid chamber, in a non-bonded state, and a separating wall part separating the liquid chamber into two portions in the tube axis direction and protruding to a vicinity of the inner circumferential surface of the outer tubular member such that a gap is defined between the separating wall part and the inner circumferential surface. The absorption and damping of the vibrations in the tube axis direction are achieved owing to the flow resistance of the filling liquid that is forced to flow from one of the liquid chamber portions of each liquid chamber separated by the corresponding separating wall part in the tube axis direction to the other of the liquid chamber portions via the gap.

However, in the liquid filled bushing disclosed in JPH6-74288A, the vibration absorbing/damping characteristics (namely, stiffness of the liquid filled bushing) in the tube axis direction are determined by the size of the gap and the viscosity of the filling liquid. Also, the vibration absorbing/damping characteristics in the direction orthogonal to the tube axis are determined by the size of the orifice and the viscosity of the filling liquid. Namely, in this liquid filled bushing, the stiffness has a constant value determined in the designing stage and cannot be varied to a desired value during use.

SUMMARY OF THE INVENTION

In view of such background, a primary object of the present invention is to provide a variable stiffness bushing that is capable of varying the axial stiffness as desired with a simple configuration.

Means to Accomplish the Task

To achieve the above object, one embodiment of the present invention provides a variable stiffness bushing (1), comprising: an inner tubular member (6); an outer tubular member (7) disposed coaxially around the inner tubular member with a prescribed gap defined between the outer tubular member and the inner tubular member; a tubular elastic member (8) connecting the inner tubular member and the outer tubular member; at least one pair of liquid chambers (30) defined in the elastic member so as to be axially separated from each other; a communication passage (35) including a circumferential passage (36) provided in one of the inner tubular member and the outer tubular member and extending in a circumferential direction, the communication passage communicating the at least one pair of liquid chambers with one another; a coil (12) wound coaxially with and provided in the one of the inner tubular member and the outer tubular member; a yoke (11, 13) included in the one of the inner tubular member and the outer tubular member and provided with a gap (18) constituting the circumferential passage; and a magnetic fluid (37) filling the at least one pair of liquid chambers and the communication passage, wherein the elastic member includes a pair of first walls (31) defining axially opposite ends of the at least one pair of liquid chambers and a second wall (32) defining axially facing ends of the at least one pair of liquid chambers, and the pair of first walls and the second wall are configured such that when the inner tubular member and the outer tubular member are axially displaced relative to each other, a difference is created between volumes of the at least one pair of liquid chambers.

With this configuration, when the inner tubular member and the outer tubular member are axially displaced relative to each other, a difference is created between the volumes of the axially separated liquid chambers, and the magnetic fluid flows through the communication passage in accordance with the volume difference. At this time, by supplying electric current to the coil to generate a magnetic field around the coil such that magnetic field lines pass through the circumferential passage of the communication passage, the flow resistance of the magnetic fluid in the communication passage can be varied. Thus, the axial stiffness (stiffness against the axial displacement between inner tubular member and the outer tubular member) and damping characteristics of the variable stiffness bushing can be varied as desired by controlling the electric current supplied to the coil. In addition, the stiffness and damping characteristics of the variable stiffness bushing can be varied with a simple configuration in that the circumferential passage, the coil and the yoke are provided in/on the one of the inner tubular member and the outer tubular member.

Preferably, the pair of first walls (31) and the second wall (32) are configured such that when the inner tubular member (6) and the outer tubular member (7) are axially displaced relative to each other, an inclination angle (β) of at least a part of the second wall becomes smaller than an inclination angle (α) of each first wall of the pair of first walls.

With this configuration, because the inclination angle of at least a part of the second wall becomes smaller than the inclination angle of each first wall, a volume difference is created between the liquid chambers axially separated by the second wall, and the magnetic fluid flows through the communication passage in accordance with the created volume difference. Thus, the axial stiffness of the variable stiffness bushing can be varied by controlling the electric current supplied to the coil to vary the flow resistance of the magnetic fluid in the communication passage.

Preferably, the second wall (32) includes a high bending stiffness portion (38) extending radially over a part of the second wall.

Thereby, with a simple configuration in that the high bending stiffness portion is provided in a part of the second wall, a volume difference can be created between the axially separated liquid chambers in accordance with the axial displacement between the inner tubular member and the outer tubular member.

Preferably, the high bending stiffness portion (38) includes a reinforcement member (21) provided in/on the second wall (32).

With this configuration, the stiffness of the high bending stiffness portion can be increased owing to the stiffness of the reinforcement member without need to considerably increase the thickness of the high bending stiffness portion.

Preferably, the reinforcement member (21) is embedded in the second wall (32) so as to be axially movable together with the one of the inner tubular member (6) and the outer tubular member (7), and the reinforcement member includes an annular part (22) disposed to extend across the circumferential passage as viewed in a radial direction and a flange portion (23) extending from the annular part in a direction away from the circumferential passage and having a tip end spaced from another of the inner tubular member (6) and the outer tubular member (7).

With this configuration, it is possible to prevent the cross-sectional area of the circumferential passage from changing depending on the fluid pressure, whereby it is ensured that the magnetic fluid of an amount corresponding to the volume difference created between the axially separated liquid chambers flows through the circumferential passage. Therefore, the axial stiffness of the variable stiffness bushing can be varied accurately by controlling the electric current supplied to the coil to vary the flow resistance of the magnetic fluid in the circumferential passage. Further, because the flange portion of the reinforcement member is spaced from the other of the inner tubular member and the outer tubular member, radial displacement between the inner tubular member and the outer tubular member is allowed.

Preferably, the reinforcement member (21) is at least partially embedded in the elastic member (8) and is not in contact with the yoke (11, 13).

With this configuration, the magnetic field lines flowing through the yoke are prevented from being dispersed to the reinforcement member, and this allows the magnetic field lines flowing through the yoke to be concentrated in the circumferential passage more reliably.

Preferably, the reinforcement member (21) is made of a non-magnetic material.

This configuration is also advantageous in preventing the dispersion of the magnetic field lines flowing through the yoke to the reinforcement member, whereby the magnetic field lines flowing through the yoke are allowed to be concentrated in the circumferential passage more reliably.

Preferably, the second wall (32) constitutes a piston (52) fixed to the one of the inner tubular member and the outer tubular member and slidable relative to another of the inner tubular member and the outer tubular member.

With this configuration, the volume difference created between the axially separated liquid chambers upon an axial displacement between the inner tubular member and the outer tubular member can be increased, whereby the rate of change of the axial stiffness of the variable stiffness bushing can be increased.

Preferably, the coil (12) is constituted of a first coil (12A) and a second coil (12B) that are arranged to be axially spaced from each other at a position corresponding to the circumferential passage (36) with respect to an axial direction and are configured to generate magnetic fields in mutually opposing directions.

With this configuration, the magnetic field lines generated by the first coil and the second coil are all concentrated between the two coils, whereby it is ensured that the magnetic field is applied to the circumferential passage formed in this position.

Preferably, the at least one pair of liquid chambers includes two liquid chambers (30A, 30B) opposing each other in a first radial direction on one side with respect to an axial direction and two liquid chambers (30C, 30D) opposing each other in a second radial direction orthogonal to the first radial direction on another side with respect to the axial direction, and the four liquid chambers are in communication with the circumferential passage (36).

With this configuration, when the inner tubular member and the outer tubular member are displaced relative to each other in the first radial direction or the second radial direction, a volume difference is created between the two liquid chambers opposing each other in that direction, and the magnetic fluid of an amount corresponding to the created volume difference flows through the circumferential passage. Thus, the radial stiffness (stiffness against the radial displacement between the inner tubular member and the outer tubular member) and damping characteristics of the variable stiffness bushing can be varied as desired by controlling the electric current supplied to the coil.

Thus, according to an embodiment of the present invention, it is possible to provide a variable stiffness bushing that is capable of varying the axial stiffness as desired with a simple configuration.

BRIEF DESCRIPTION OF THE DRAWINGS

FIG. 8 is a sectional view taken along line VIII-VIII in FIG. 5;

FIG. 9 is a sectional view taken along line IX-IX in FIG. 5;

DESCRIPTION OF THE PREFERRED EMBODIMENT(S)

In the following, embodiments of the present invention will be described in detail with reference to the drawings.

First Embodiment

Figure 1:
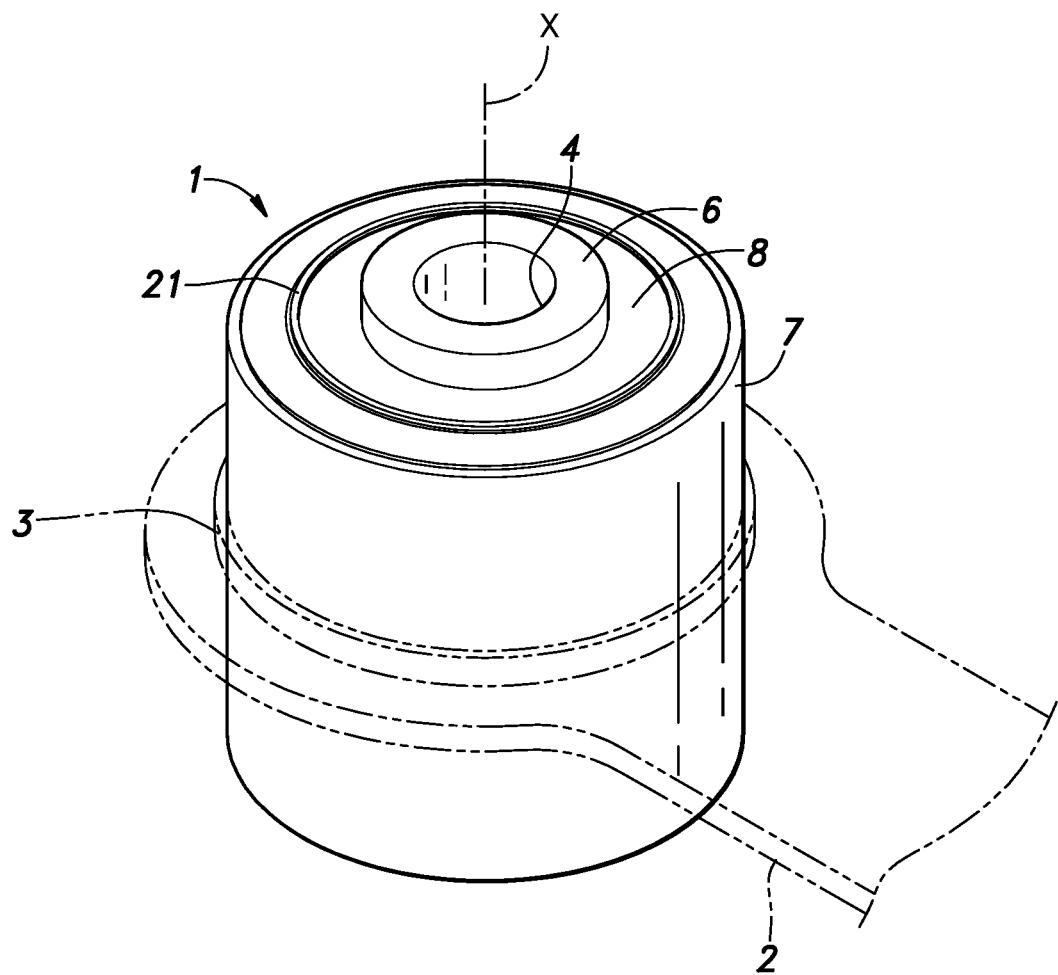
FIG. 1 is a perspective view showing a variable stiffness bushing according to the first embodiment of the invention.

First, with reference to FIGS. 1 to 10, a variable stiffness bushing 1 according to the first embodiment of the present invention will be described. As shown in FIG. 1, the variable stiffness bushing 1 is provided in a lower arm 2 of an automotive suspension 101 (see FIG. 16). Specifically, an outboard end of the lower arm 2 is provided with a cylindrical collar 3, and the variable stiffness bushing 1 having a cylindrical shape is coaxially fitted in the collar 3. The variable stiffness bushing 1 is formed with an inner bore (hereinafter referred to as a bolt insertion hole 4) extending along an axis X thereof. A bolt is inserted in the bolt insertion hole 4 and is fastened to a through-hole formed in a support wall. Thereby, the lower arm 2 is pivotally connected to a vehicle body 112 (see FIG. 16), a trailing arm 103 (see FIG. 15) or the like via the variable stiffness bushing 1.

In the following, the variable stiffness bushing 1 will be described in detail. In the following description, the vertical direction is defined as the direction of the axis X of the variable stiffness bushing 1 (namely, the direction of extension of the bolt insertion hole 4). It is to be noted, however, that such reference of the direction does not limit the arrangement of the variable stiffness bushing 1.

Figure 2:
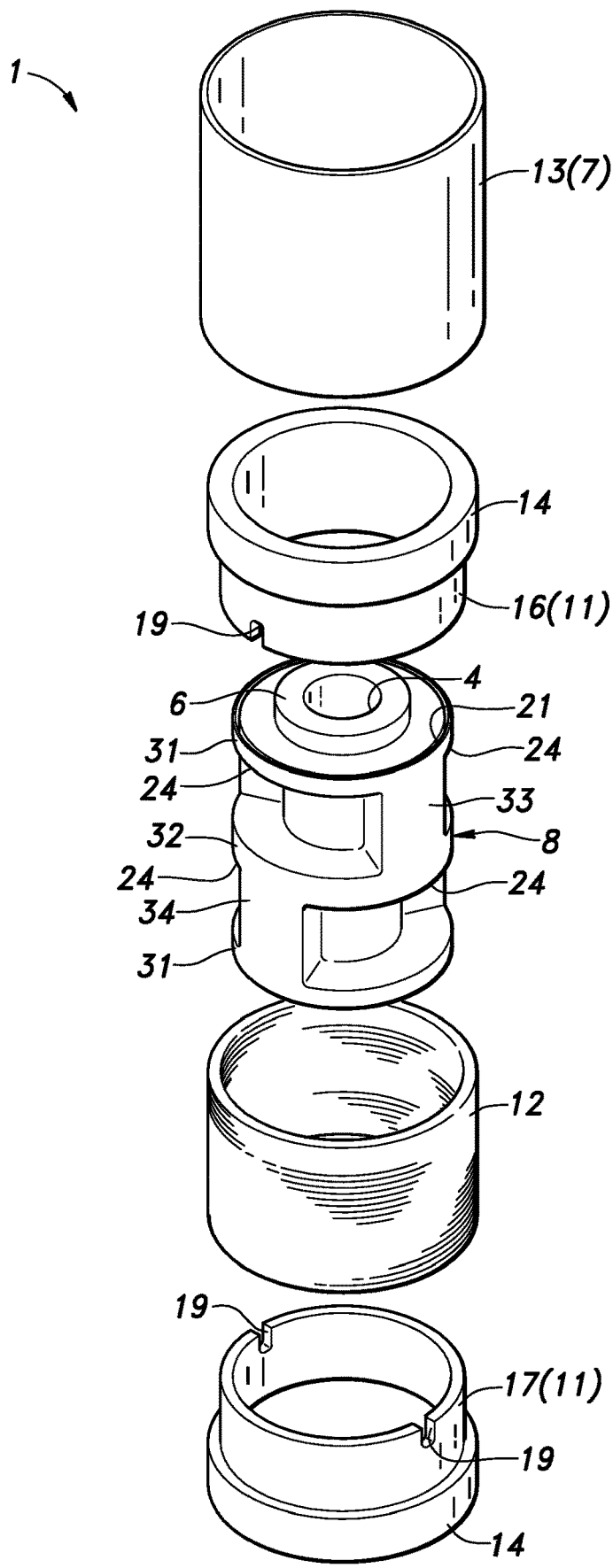
FIG. 2 is an exploded perspective view of the variable stiffness bushing shown in FIG. 1.
Figure 3:
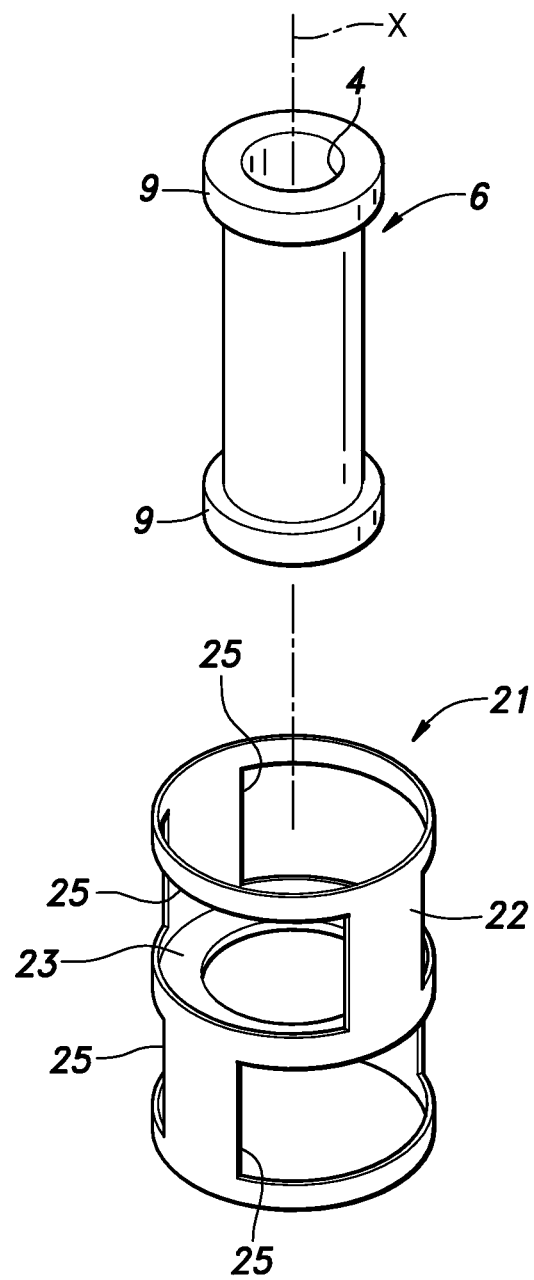
FIG. 3 is an exploded perspective view of a part of the variable stiffness bushing shown in FIG. 2.
Figure 4:
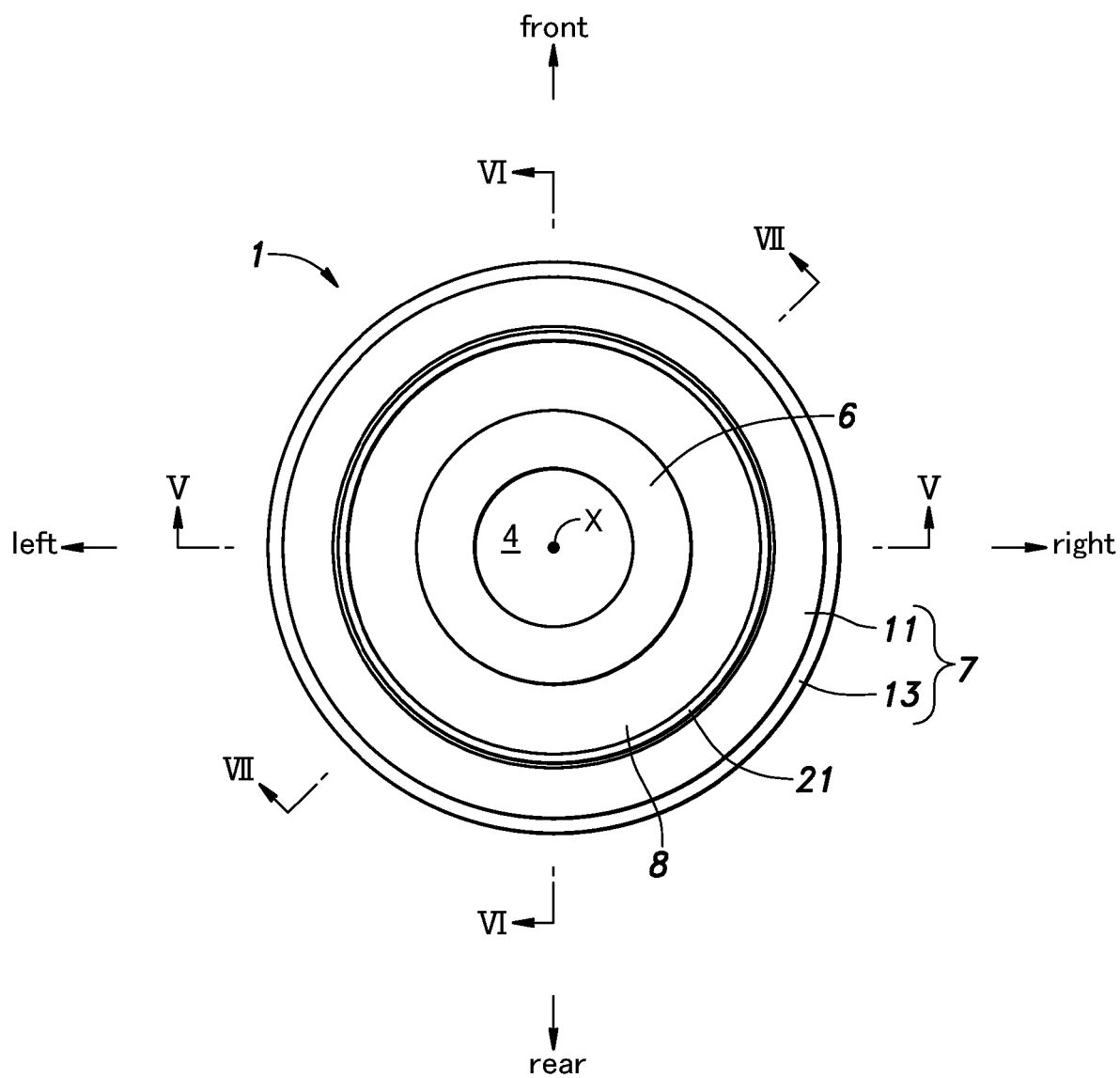
FIG. 4 is a plan view of the variable stiffness bushing shown in FIG. 1.
Figure 5:
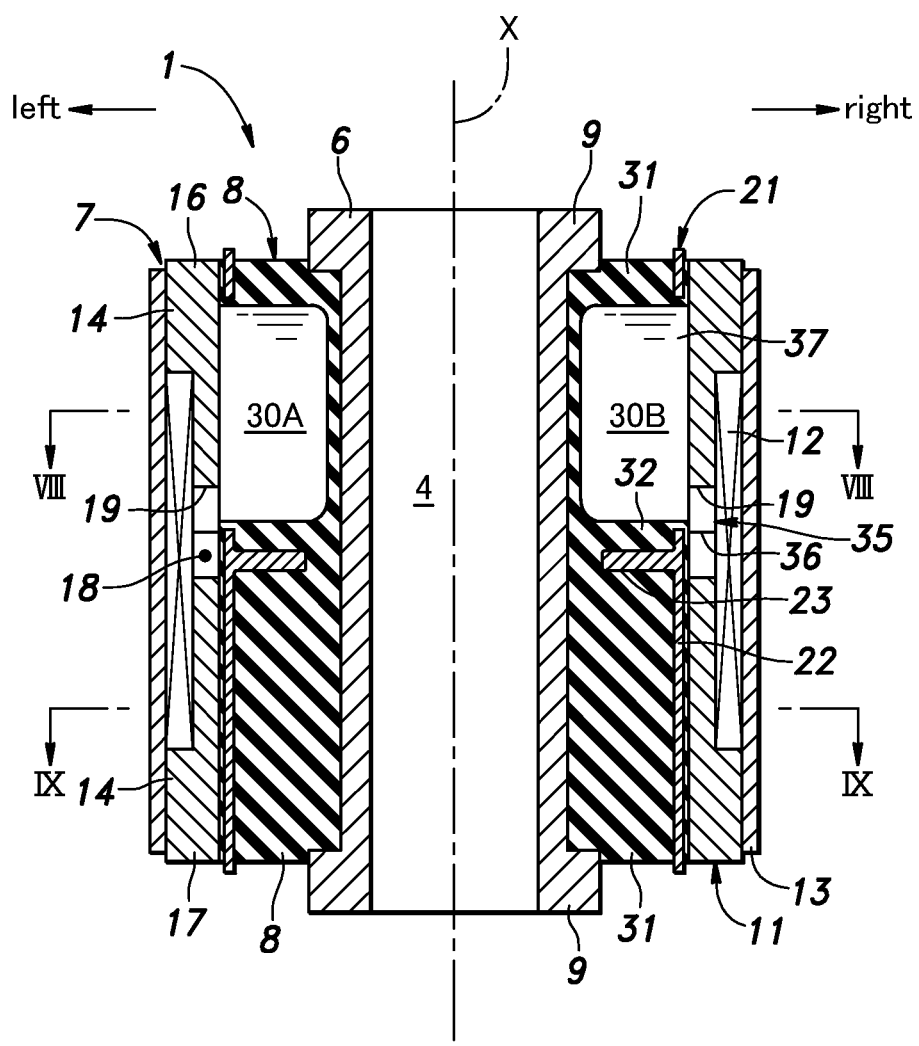
FIG. 5 is a sectional view taken along line V-V in FIG. 4.
Figure 6:
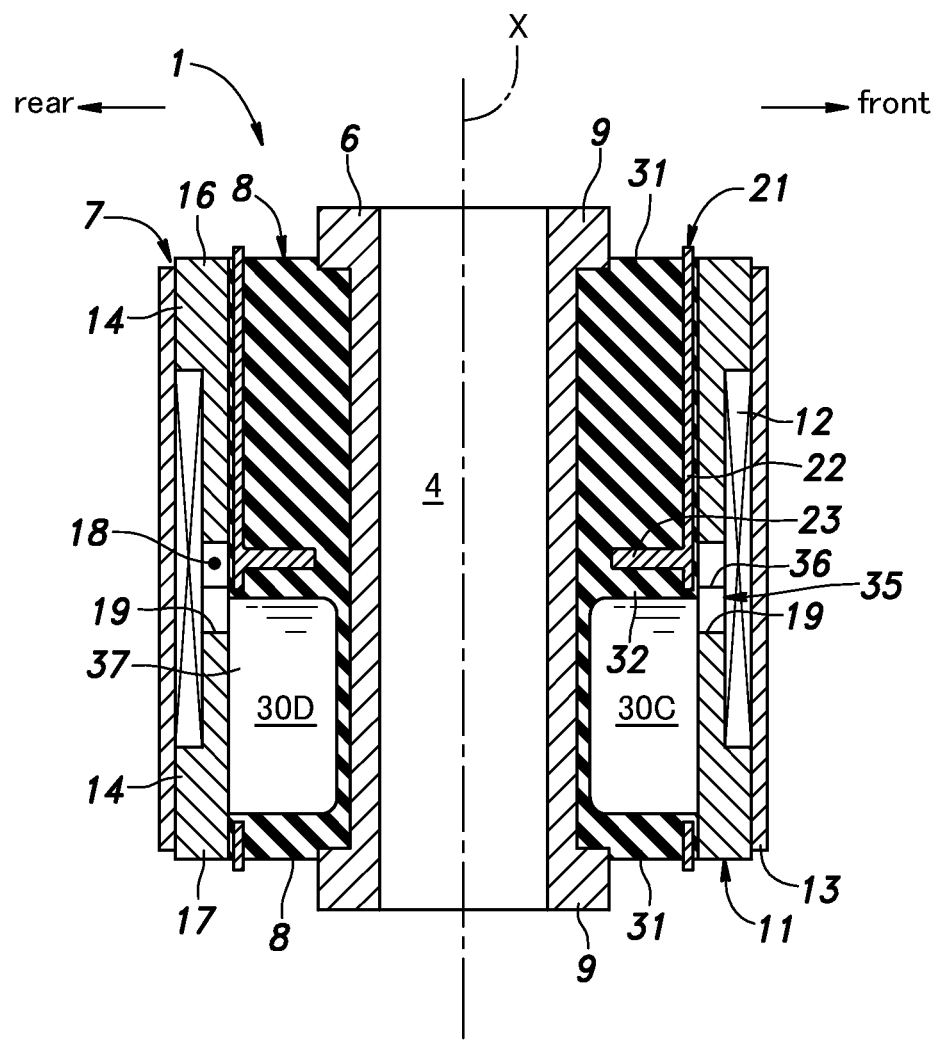
FIG. 6 is a sectional view taken along line VI-VI in FIG. 4.
Figure 7:
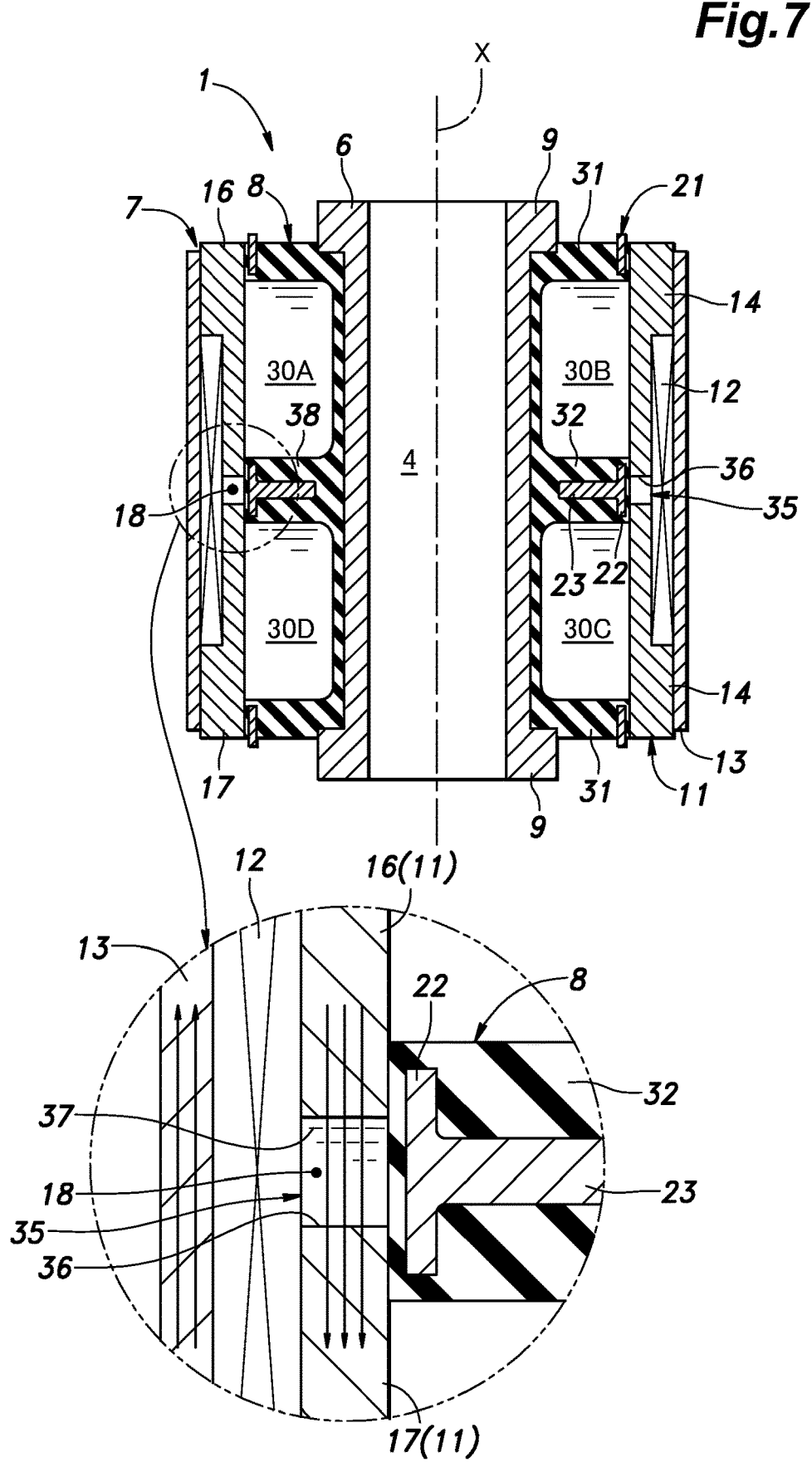
FIG. 7 is a sectional view taken along line VII-VII in FIG. 4.

FIG. 2 is an exploded perspective view of the variable stiffness bushing 1, FIG. 3 is an exploded perspective view of a part of the variable stiffness bushing 1, FIG. 4 is a plan view of the variable stiffness bushing 1, and FIGS. 5, 6, and 7 are sectional views taken along line V-V, line VI-VI, and line VII-VII in FIG. 4, respectively. As shown in FIGS. 2 to 7, the variable stiffness bushing 1 includes an inner tubular member 6 defining the bolt insertion hole 4, an outer tubular member 7 disposed coaxially around the inner tubular member 6 with a prescribed gap defined between the inner tubular member 6 and the outer tubular member 7, and an elastic member 8 interposed between the inner tubular member 6 and the outer tubular member 7 and connecting the inner tubular member 6 and the outer tubular member 7. The elastic member 8 has a substantially cylindrical shape.

The inner tubular member 6 has a cylindrical shape arranged along the axis X extending in the vertical direction and includes annular thick-walled portions 9 projecting radially outward at upper and lower end portions thereof, respectively. In other words, an axially intermediate part of the inner tubular member 6 is thin-walled and has a smaller outer diameter than the thick-walled portions 9. The inner tubular member 6 is made of a material having high stiffness, such as a metal. The inner tubular member 6 may be made to contain a metal having a high permeability, such as iron or cobalt, or may be made to contain a metal having a low permeability, such as aluminum.

The outer tubular member 7 includes a cylindrical inner yoke 11 disposed along the axis X, a coil 12 coaxially wound around the inner yoke 11, and an outer yoke 13 surrounding the coil 12. The outer yoke 13 is joined to an upper end and a lower end of the inner yoke 11 at positions above and below the coil 12, respectively.

The inner yoke 11 and the outer yoke 13 are members made of a material having a high permeability, and preferably contain a metal that exhibits ferromagnetic properties, such as iron or cobalt. In the present embodiment, the inner yoke 11 and the outer yoke 13 are made of iron.

The outer yoke 13 has a cylindrical shape arranged along the axis X and specifically is in the form of a single-tube pipe having a constant wall thickness and diameter. The inner yoke 11 has a cylindrical shape arranged along the axis X and is provided with a pair of annular flange parts 14 at an upper end and a lower end thereof, respectively. The flange parts 14 project radially outward at the upper and lower end portions of the inner yoke 11, respectively, to contact the outer yoke 13. Namely, each of the flange parts 14 has an outer diameter substantially the same as the inner diameter of the outer yoke 13. A cylindrical space is defined between the outer circumferential surface of the axially intermediate part of the inner yoke 11 and the inner circumferential surface of the outer yoke 13, and the coil 12 is disposed in this space.

The coil 12 is a member formed by winding a coated copper wire into a coil shape and encapsulating the wound copper wire in resin in a cylindrical shape, with end portions of the copper wire being drawn out as lead wires. The coil 12 has an inner diameter same as the outer diameter of the axially intermediate part of the inner yoke 11 and an outer diameter same as the inner diameter of the outer yoke 13. Though not shown in the drawings, an outer circumferential surface of at least one of the upper and lower flange parts 14 is formed with an axially extending groove such that the lead wires of the coil 12 can be drawn out from an axial end surface of the inner yoke 11 through the groove.

The inner yoke 11 is divided into upper and lower parts at an axially intermediate position thereof or is constituted of a pair of vertically arranged cylindrical yoke members (hereinafter referred to as an upper inner yoke 16 and a lower inner yoke 17). The upper inner yoke 16 extends downward from the upper flange part 14 along the inner surface of the coil 12, and the lower inner yoke 17 extend upward from the lower flange part 14 along the inner surface of the coil 12. The lower end of the upper inner yoke 16 and the upper end of the lower inner yoke 17 oppose and are spaced from each other at a position corresponding to the axially intermediate part of the coil 12 to define an annular magnetic gap 18 in the inner yoke 11.

The lower end of the upper inner yoke 16 is formed with a pair of notches 19 at positions opposing each other via the axis X (at positions circumferentially apart from each other by 180 degrees). The upper end of the lower inner yoke 17 also is formed with a pair of notches 19 at positions opposing each other via the axis X (at positions circumferentially apart from each other by 180 degrees). The pair of notches 19 of the lower inner yoke 17 and the pair of notches 19 of the upper inner yoke 16 are provided at circumferentially different positions (in the present embodiment, the pair of notches 19 of the lower inner yoke 17 is circumferentially shifted from the pair of notches 19 of the upper inner yoke 16 by 90 degrees).

The elastic member 8 is made of an elastic material such as an elastomer (or rubber) and is fitted into the space between the outer tubular member 7 and the inner tubular member 6. Further, a cylindrical reinforcement member 21 (FIG. 3) is embedded in the elastic member 8 in a coaxial manner. More specifically, the elastic member 8 is formed integrally with the inner tubular member 6 and the reinforcement member 21 by pouring unvulcanized rubber into a mold in which the inner tubular member 6 and the reinforcement member 21 are arranged at prescribed positions and then vulcanizing the rubber. The reinforcement member 21 is not exposed on the outer circumferential surface of the elastic member 8. The elastic member 8 is fitted in the outer tubular member 7 and the outer peripheral portion thereof is joined to the outer tubular member 7. The outer diameter of the elastic member 8 is slightly larger than the outer diameter of the reinforcement member 21. The outer diameter of the elastic member 8 is also slightly larger than the inner diameter of the outer tubular member 7 before the elastic member 8 is fitted in the outer tubular member 7. Thus, in the assembled state, the outer peripheral portion of the elastic member 8 is in close contact with the inner circumferential surface of the outer tubular member 7, and the reinforcement member 21 is not in contact with the outer tubular member 7.

The reinforcement member 21 is a rigid member made of a non-magnetic material (preferably, a non-magnetic metal) having a permeability lower than that of the metal constituting the inner yoke 11 and serves to maintain the shape of the outer circumferential surface of the elastic member 8. The reinforcement member 21 is preferably made of aluminum, for example.

As shown in FIG. 3, the reinforcement member 21 is a cage-like member including a cylindrical tubular portion 22 disposed along the axis X and an annular flange portion 23 provided on an axially intermediate part of the tubular portion 22. The flange portion 23 projects radially inward from the tubular portion 22. The tubular portion 22 of the reinforcement member 21 is provided in the outer peripheral portion of the elastic member 8 so as not to be exposed on the outer circumferential surface of the elastic member 8. In the present embodiment, a large part of the reinforcement member 21 except for the upper end and the lower end of the tubular portion 22 is embedded in the elastic member 8 though in another embodiment, the entirety of the reinforcement member 21 may be embedded in the elastic member 8.

The outer circumferential surface of the elastic member 8 is formed with four recesses 24 (FIG. 2) that define respective liquid chambers 30 (30A to 30D) (see FIG. 7) in cooperation with the outer tubular member 7. Namely, the elastic member 8 forms four liquid chambers 30 between the outer tubular member 7 and the inner tubular member 6. Two of the liquid chambers 30 are formed in an upper portion of the elastic member 8 and the other two of the liquid chambers 30 are formed in a lower portion of the elastic member 8. The upper two liquid chambers 30 (30A, 30B) and the lower two liquid chambers 30 (30C, 30D) are axially separated by the elastic member 8. Thus, the elastic member 8 includes a pair of first walls 31 provided at upper and lower ends thereof to define the axially opposite ends of the upper two liquid chambers 30 and the lower two liquid chambers 30 and a second wall 32 provided at an axially intermediate part thereof to define the mutually facing ends of the upper two liquid chambers 30 and the lower two liquid chambers 30.

FIGS. 8 and 9 are sectional views taken along line VIII-VIII and line IX-IX in FIG. 5, respectively. As shown in FIGS. 2, 5, and 8, the upper two liquid chambers 30 (30A, 30B) are formed at positions opposing each other via the axis X (at positions circumferentially apart from each other by 180 degrees) and are circumferentially separated from each other by the elastic member 8. Thus, the elastic member 8 includes a pair of third walls 33 each defining ends of the upper two liquid chambers 30 circumferentially opposing each other via the third wall 33. The pair of third walls 33 is arranged on a straight line passing the axis X in plan view, and the upper two liquid chambers 30 have the same shape and the same volume when the inner tubular member 6 and the outer tubular member 7 are not displaced relative to each other (or when the variable stiffness bushing 1 is in the neutral state).

As shown in FIGS. 2, 6, and 9, the lower two liquid chambers 30 (30C, 30D) are formed at positions opposing each other via the axis X (circumferentially apart from each other by 180 degrees) and circumferentially different from the positions of the upper two liquid chambers 30, and are circumferentially spaced from each other by the elastic member 8. In the present embodiment, the lower two liquid chambers 30 are arranged at positions circumferentially shifted from the upper two liquid chambers 30 by 90 degrees, and the opposing direction of the lower two liquid chambers 30 and the opposing direction of the upper two liquid chambers 30 cross each other orthogonally. Thus, the elastic member 8 includes a pair of fourth walls 34 each defining ends of the lower two liquid chambers 30 circumferentially opposing each other via the fourth wall 34. The pair of fourth walls 34 is arranged on a straight line passing the axis X in plan view, and, the lower two liquid chambers 30 have the same shape and the same volume when the variable stiffness bushing 1 is in the neutral state. In addition, the upper two liquid chambers 30 and the lower two liquid chambers 30 have the same shape and the volume when the variable stiffness bushing 1 is in the neutral state.

As shown in FIGS. 2 and 5, the upper two liquid chambers 30 are in communication with the annular magnetic gap 18 via the respective notches 19 of the upper inner yoke 16. As shown in FIGS. 2 and 6, the lower two liquid chambers 30 are in communication with the annular magnetic gap 18 via the respective notches 19 of the lower inner yoke 17. Thus, the four liquid chambers 30 are in communication with one another via the four notches 19 and the magnetic gap 18, and the four notches 19 and the magnetic gap 18 constitute s communication passage 35 that communicates the multiple (four in this embodiment) liquid chambers 30 with one another.

It is to be noted that the upper two liquid chambers 30 and the lower two liquid chambers 30 constitute two pairs of axially separated liquid chambers 30 formed in the elastic member 8.

A part of the communication passage 35 formed by the magnetic gap 18 provided in the outer tubular member 7 constitutes a circumferential passage 36 that extends in the circumferential direction. Parts of the communication passage 35 formed by the notches 19 are provided in the outer tubular member 7 and extend in the axial direction and the radial direction to communicate the corresponding liquid chambers 30 with the circumferential passage 36.

These four liquid chambers 30 and the communication passage 35 are filled with a magnetic fluid 37. In the present disclosure, the magnetic fluid 37 is an incompressible fluid containing fine ferromagnetic particles such as iron particles dispersed in a solvent such as an oil, and preferably consists of a magneto-rheological fluid (MRF) or a magneto-rheological compound (MRC) whose viscoelasticity (particularly, viscosity) changes depending on the applied magnetic field. In the present embodiment, an MRC is used as the magnetic fluid 37. When a magnetic field is applied to the magnetic fluid 37, the fine iron particles therein are aligned along the direction of the magnetic field to form chain-like clusters. Thereby, the chain-like clusters hinders the flow of the solvent in a direction orthogonal to the magnetic field, whereby the viscosity of the magnetic fluid 37 increases and the magnetic fluid 37 is semi-solidified.

In the present embodiment, the upper two liquid chambers 30 are arranged side by side along the direction of extension of the lower arm 2 in which the variable stiffness bushing 1 is provided. In the following description, the upper two liquid chambers 30 will be referred to as an upper left liquid chamber 30A and an upper right liquid chamber 30B, respectively, and the lower two liquid chambers 30 will be referred to as a lower front liquid chamber 30C and a lower rear liquid chamber 30D, respectively.

As shown in FIGS. 3 and 5 to 7, the parts of the tubular portion 22 of the reinforcement member 21 corresponding to the four liquid chambers 30 are each formed with an opening 25, and the reinforcement member 21 is not exposed to the liquid chambers 30. The part of the tubular portion 22 between the upper two openings 25 and the lower two openings 25 forms an annular strip and extends vertically across the circumferential passage 36 of the communication passage 35 on an inner side of the circumferential passage 36 so as to radially oppose the circumferential passage 36.

The flange portion 23 of the reinforcement member 21 is embedded in the second wall 32, and the tip end (inner peripheral edge) thereof is spaced from the outer circumferential surface of the inner tubular member 6. Therefore, the inner tubular member 6 can move radially and axially relative to the reinforcement member 21 and the outer tubular member 7 along with a deformation of the elastic member 8 and a volume change of the liquid chambers 30. The separation distance between the flange portion 23 and the inner tubular member 6 is larger than the separation distance between the tubular portion 22 and the outer tubular member 7. Therefore, the reinforcement member 21 axially moves substantially with the outer tubular member 7. The flange portion 23 of the reinforcement member 21 is provided in the outer peripheral portion of the second wall 32 and increases the bending stiffness of the outer peripheral portion of the second wall 32. Thus, the flange portion 23 serves as a reinforcement plate provided in a part of the second wall 32 with respect to the radial direction and forms a high bending stiffness portion 38 that extends radially in a part of the second wall 32 (see FIG. 7).

Next, an operation of the variable stiffness bushing 1 of the present embodiment will e described. FIG. 8 is a sectional view taken along line VIII-VIII in FIG. 5. As will be appreciated by referring to FIGS. 5 and 8, when the inner tubular member 6 is displaced laterally relative to the outer tubular member 7, the elastic member 8 deforms such that the volume of the upper left liquid chamber 30A and the volume of the upper right liquid chamber 30B change in an inverse (or complementary) relationship to each other (namely, if the volume of one of the liquid chambers 30A and 30B increases, the volume of the other of the liquid chambers 30A and 30B decreases). Such a deformation of the elastic member 8 causes the magnetic fluid 37 in the other of the liquid chambers 30A and 30B to flow to the one of the liquid chambers 30A and 30B via the communication passage 35. At this time, resistance is applied to the magnetic fluid 37 flowing through the communication passage 35 and the vibration acting on the variable stiffness bushing 1 is damped.

FIG. 9 is a sectional view taken along line IX-IX in FIG. 5. As will be appreciated by referring to FIGS. 6 and 9, when the inner tubular member 6 is displaced in the fore and aft direction relative to the outer tubular member 7, the volume of the lower front liquid chamber 30C and the volume of the lower rear liquid chamber 30D change in an inverse relationship to each other, and thereupon, the magnetic fluid 37 flows through the communication passage 35. At this time also, resistance is applied to the magnetic fluid 37 flowing through the communication passage 35 and the vibration acting on the variable stiffness bushing 1 is damped.

Figure 10C:
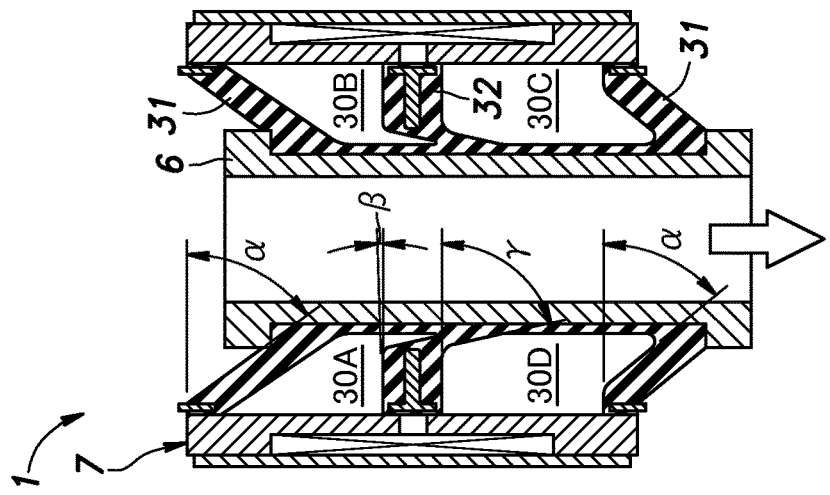
FIG. 10C is a diagram for explaining a part of the operation of the variable stiffness bushing when an axial displacement takes place therein.
Figure 10B:
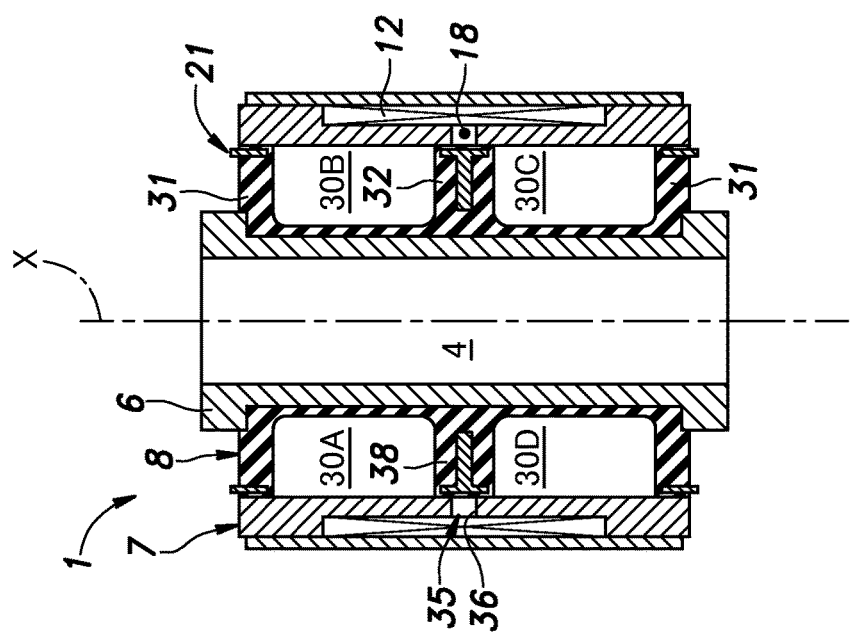
FIG. 10B is a diagram for explaining a part of the operation of the variable stiffness bushing when an axial displacement takes place therein.
Figure 10A:
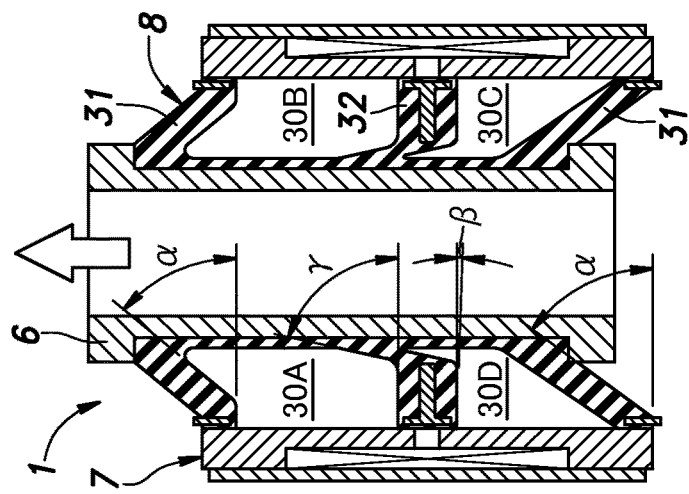
FIG. 10A is a diagram for explaining a part of the operation of the variable stiffness bushing when an axial displacement takes place therein.

FIGS. 10A to 10C are diagrams for explaining the operation of the variable stiffness bushing 1 when an axial displacement takes place therein. FIG. 10B shows a state same as that shown in sectional view of FIG. 7 (a state in which no axial displacement takes place in the variable stiffness bushing 1), FIG. 10A shows a state in which the inner tubular member 6 is displaced upward relative to the outer tubular member 7, and FIG. 10C shows a state in which the inner tubular member 6 is displaced downward relative to the outer tubular member 7.

As shown in FIG. 10A, when the inner tubular member 6 is displaced upward relative to the outer tubular member 7, the upper and lower first walls 31 undergo elastic deformation to be inclined upward from the outer peripheral side toward the inner peripheral side at an inclination angle α in accordance with the amount of displacement (namely, the shape of each of the upper and lower first walls 31 changes from a disc-like shape to a frustoconical shape). On the other hand, since the second wall 32 is provided with the flange portion 23 in the outer peripheral portion thereof, the outer peripheral portion of the second wall 32 undergoes almost no deformation and only the portion thereof radially inward of the flange portion 23 undergoes elastic deformation to be inclined upward from the outer peripheral side toward the inner peripheral side. Thus, the inclination angle β of the high bending stiffness portion 38 of the second wall 32 is smaller than the inclination angle α of the first walls 31, and the inclination angle γ of the low bending stiffness portion of the second wall 32 which is radially inward of the high bending stiffness portion 38 is larger than the inclination angle α of the first walls 31.

As a result of the above deformation, the volume of each of the upper left liquid chamber 30A and the upper right liquid chamber 30B becomes larger than that shown in FIG. 10B, while the volume of each of the lower front liquid chamber 30C and the lower rear liquid chamber 30D becomes smaller than that shown in FIG. 10B.

Conversely, when the inner tubular member 6 is displaced downward relative to the outer tubular member 7, as shown in FIG. 10C, the upper and lower first walls 31 undergo elastic deformation to be inclined downward from the outer peripheral side toward the inner peripheral side at an inclination angle α in accordance with the amount of displacement. On the other hand, the second wall 32 undergoes almost no deformation in the outer peripheral portion thereof, and only the portion thereof radially inward of the flange portion 23 undergoes elastic deformation to be inclined downward from the outer peripheral side toward the inner peripheral side. In this case also, the inclination angle β of the high bending stiffness portion 38 of the second wall 32 is smaller than the inclination angle α of the first walls 31, and the inclination angle γ of the low bending stiffness portion of the second wall 32 which is radially inward of the high bending stiffness portion 38 is larger than the inclination angle α of the first walls 31.

As a result of the above deformation, the volume of each of the upper left liquid chamber 30A and the upper right liquid chamber 30B becomes smaller than that shown in FIG. 10B, while the volume of each of the lower front liquid chamber 30C and the lower rear liquid chamber 30D becomes larger than that shown in FIG. 10B.

The volume of the upper left liquid chamber 30A and the upper right liquid chamber 30B and the volume of the lower front liquid chamber 30C and the lower rear liquid chamber 30D change in an inverse relationship to each other, and the amount of volume increase is the same as the amount of volume decrease. When the elastic member 8 undergoes deformation along with such a volume change of the liquid chambers 30, the magnetic fluid 37 flows through the communication passage 35. At this time, resistance is applied to the magnetic fluid 37 flowing through the communication passage 35 and the vibration acting on the variable stiffness bushing 1 is damped.

As shown in FIG. 7, when a voltage is applied to the ends of the copper wire of the coil 12, the electric current flowing through the coil 12 generates a magnetic field around the coil 12. In the partial enlarged view of FIG. 7, magnetic field lines corresponding to the magnetic field generated by the coil 12 are indicated by arrows. The outer yoke 13, the upper inner yoke 16, and the lower inner yoke 17 of the outer tubular member 7 jointly form a magnetic circuit, and the magnetic field is concentrated in the circumferential passage 36 of the communication passage 35.

The application of the magnetic field to the circumferential passage 36 increases the viscosity of the magnetic fluid 37 in the communication passage 35. Consequently, the resistance applied to the magnetic fluid 37 flowing through the communication passage 35 increases, and therefore, the damping force for damping the vibration acting on the variable stiffness bushing 1 increases. In addition, the increase in the resistance applied to the magnetic fluid 37 flowing through the communication passage 35 makes the inner tubular member 6 less easy to move relative to the outer tubular member 7, whereby the stiffness of the variable stiffness bushing 1 increases. Thus, it is possible to control the damping force for damping the vibration of the variable stiffness bushing 1 by controlling the voltage applied to the coil 12.

Next, advantages of the variable stiffness bushing 1 will be described. In the variable stiffness bushing 1, it is possible to vary the viscosity of the magnetic fluid 37 and to thereby vary the stiffness by supplying electric current to the coil 12. To vary the stiffness effectively, it is preferred that the magnetic field generated by the coil 12, which serves as a magnetic field source, is concentrated in the flow path of the magnetic fluid 37.

In the present embodiment, as shown in FIG. 7, the communication passage 35 communicating the four liquid chambers 30, which are constituted of two pairs of axially separated liquid chambers 30, with one another includes the circumferential passage 36 provided in the outer tubular member 7 to extend in the circumferential direction. The coil 12 is wound coaxially with and provided in the outer tubular member 7, and the outer tubular member 7 includes the inner yoke 11 provided with the magnetic gap 18, which also serves as the circumferential passage 36. The pair of first walls 31 and the second wall 32 of the elastic member 8 are configured such that when the inner tubular member 6 and the outer tubular member 7 are axially displaced relative to each other, a difference is created between the volumes of the axially separated liquid chambers 30 (see FIGS. 10A-10C).

With such a configuration, the magnetic fluid 37 flows through the communication passage 35 in accordance with the created volume difference. At this time, by supplying electric current to the coil 12 such that the magnetic field generated around the coil 12 is concentrated in the circumferential passage 36 of the communication passage 35, the flow resistance of the magnetic fluid 37 in the communication passage 35 can be varied. Thus, the axial stiffness (stiffness against the axial displacement between the inner tubular member 6 and the outer tubular member 7) and damping characteristics of the variable stiffness bushing 1 can be varied as desired by controlling the electric current supplied to the coil 12. In addition, the stiffness and damping characteristics of the variable stiffness bushing 1 can be varied with a simple configuration in that the circumferential passage 36, the coil 12, and the inner yoke 11 are provided in/on the outer tubular member 7.

The pair of first walls 31 and the second wall 32 are configured such that when the inner tubular member 6 and the outer tubular member 7 are axially displaced relative to each other, at least a part of the second wall 32 has an inclination angle β smaller than an inclination angle α each first wall 31. Thereby, a volume difference is created between the liquid chambers 30 axially separated by the second wall 32 and the magnetic fluid 37 flows through the communication passage 35 in accordance with the created volume difference. Thus, the axial stiffness of the variable stiffness bushing 1 can be varied by controlling the electric current supplied to the coil 12 to vary the flow resistance of the magnetic fluid 37 in the communication passage 35.

The second wall 32 includes the high bending stiffness portion 38 extending radially over a part of the second wall 32, and with such a simple configuration, a volume difference can be created between the axially separated liquid chambers 30 in accordance with the axial displacement between the inner tubular member 6 and the outer tubular member 7.

Since the high bending stiffness portion 38 includes the reinforcement member 21 (more specifically, the flange portion 23) provided in/on the second wall 32, the stiffness of the high bending stiffness portion 38 can be increased owing to the stiffness of the reinforcement member 21 without need to considerably increase the thickness of the high bending stiffness portion 38.

The reinforcement member 21 is at least partially embedded in the elastic member 8 so as to be axially movable together with the outer tubular member 7 in which the coil 12 and the circumferential passage 36 are provided. Further, the reinforcement member 21 includes an annular part (of the tubular portion 22) disposed to extend across the circumferential passage 36 as viewed in the radial direction and the flange portion 23 extending from the annular part of the tubular portion 22 in a direction away from the circumferential passage 36 and having a tip end spaced from the inner tubular member 6. With this configuration, it is possible to prevent the cross-sectional area of the circumferential passage 36 from changing depending on the fluid pressure, whereby it is ensured that the magnetic fluid 37 of an amount corresponding to the volume difference created between the axially separated liquid chambers 30 flows through the circumferential passage 36. Therefore, the axial stiffness of the variable stiffness bushing 1 can be varied accurately by controlling the electric current supplied to the coil 12 to vary the flow resistance of the magnetic fluid 37 in the circumferential passage 36. Further, because the flange portion 23 of the reinforcement member 21 is spaced from the inner tubular member 6, radial displacement between the inner tubular member 6 and the outer tubular member 7 is allowed.

The reinforcement member 21 is at least partly embedded in the elastic member 8 and is not in contact with the inner yoke 11. Therefore, the magnetic field lines flowing through the inner yoke 11 are prevented from being dispersed to the reinforcement member 21, and this allows the magnetic field lines flowing through the inner yoke 11 to be concentrated in the circumferential passage 36 more reliably.

Further, the reinforcement member 21 is made of a non-magnetic material. This feature also is advantageous in preventing the magnetic field lines flowing through the inner yoke 11 from being dispersed to the reinforcement member 21, whereby the magnetic field lines flowing through the inner yoke 11 are allowed to be concentrated in the circumferential passage 36 more reliably.

The elastic member 8 is formed with two liquid chambers 30 (30A, 30B) opposing each other in a first radial direction on one side with respect to the axial direction and two liquid chambers 30 (30C, 30D) opposing each other in a second radial direction orthogonal to the first radial direction on the other side with respect to the axial direction such that the two liquid chambers 30 (30A, 30B) opposing in the first radial direction are axially separated from the two liquid chambers 30 (30C, 30D) opposing in the second radial direction. Further, these four liquid chambers 30 are in communication with the circumferential passage 36. Thereby, when the inner tubular member 6 and the outer tubular member 7 are displaced relative to each other in the lateral direction or the fore and aft direction (each being a radial direction), a volume difference is created between the two liquid chambers 30 opposing each other in that direction, and the magnetic fluid 37 of an amount corresponding to the created volume difference flows through the circumferential passage 36. Thus, the radial stiffness (stiffness against the radial displacement between the inner tubular member 6 and the outer tubular member 7) and damping characteristics of the variable stiffness bushing 1 can be varied as desired by controlling the electric current supplied to the coil 12.

Second Embodiment

Next, with reference to FIGS. 11A to 11C, a variable stiffness bushing 1 according to the second embodiment of the invention will be described. It is to be noted that the elements similar or the same in form or function as those of the first embodiment will be denoted by the same reference numerals and a duplicated description thereof will be omitted.

Figure 11A:
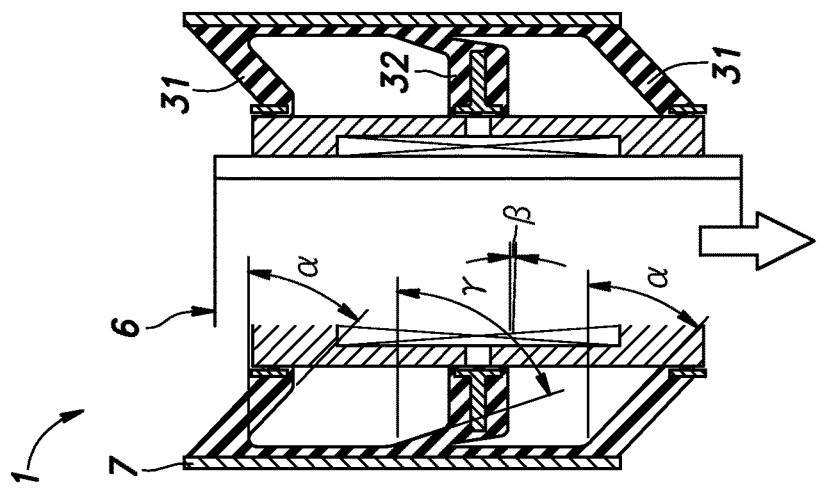
FIG. 11A is a diagram for explaining a part of the operation of a variable stiffness bushing according to the second embodiment when an axial displacement takes place therein.
Figure 11B:
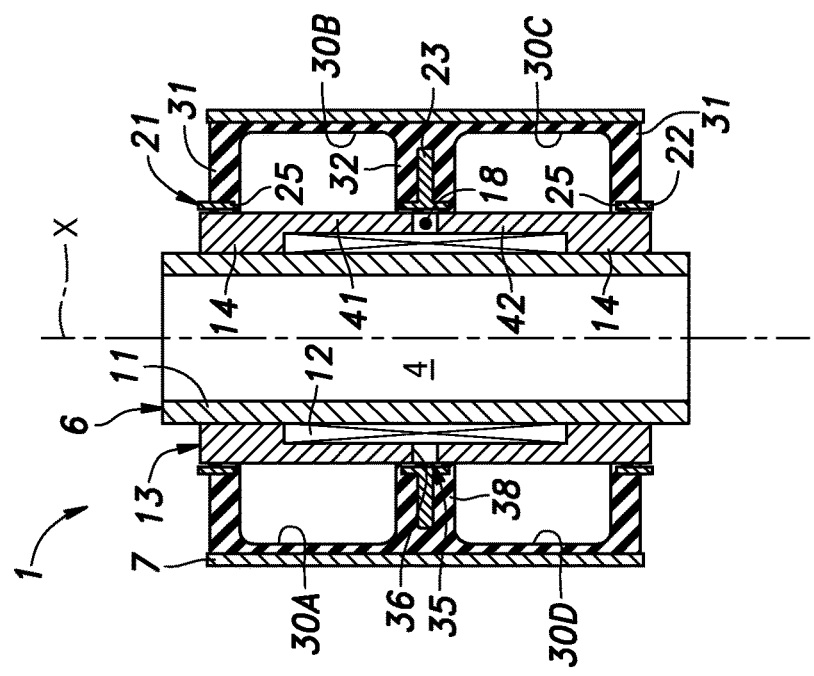
FIG. 11B is a diagram for explaining a part of the operation of a variable stiffness bushing according to the second embodiment when an axial displacement takes place therein.
Figure 11C:
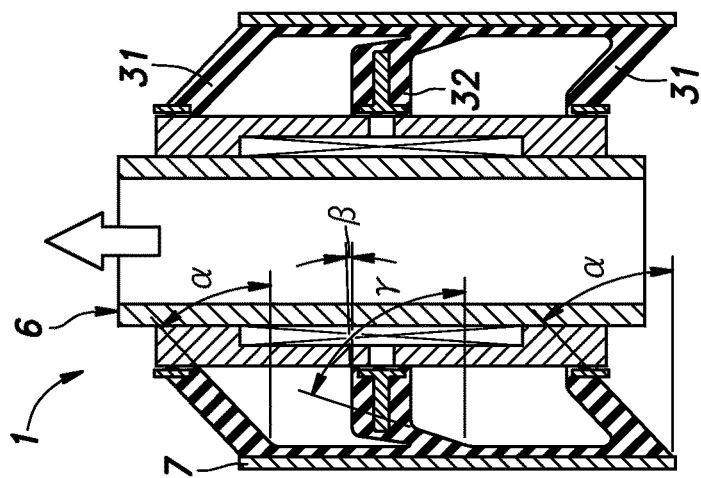
FIG. 11C is a diagram for explaining a part of the operation of a variable stiffness bushing according to the second embodiment when an axial displacement takes place therein.

FIGS. 11A to 11C are diagrams for explaining the operation of the variable stiffness bushing 1 according to the second embodiment when an axial displacement takes place therein. FIG. 11B is a sectional view showing a state of the variable stiffness bushing 1 corresponding to that shown in FIG. 7 (a state in which no axial displacement takes place in the variable stiffness bushing 1), FIG. 11A shows a state in which the inner tubular member 6 is displaced upward relative to the outer tubular member 7, and FIG. 11C shows a state in which the inner tubular member 6 is displaced downward relative to the outer tubular member 7.

As shown in FIG. 11B, in this variable stiffness bushing 1, the circumferential passage 36 of the communication passage 35, the coil 12, and the outer yoke 13, which is provided with the magnetic gap 18 serving as the circumferential passage 36, are provided in the inner tubular member 6. Specifically, the inner tubular member 6 includes the cylindrical inner yoke 11 disposed along the axis X, the coil 12 coaxially wound around the inner yoke 11, and the outer yoke 13 surrounding the coil 12 and joined to the upper end and the lower end of the inner yoke 11 at positions above and below the coil 12.

The inner yoke 11 has a cylindrical shape arranged along the axis X and specifically is in the form of a single-tube pipe having a constant wall thickness and diameter. The outer yoke 13 has a cylindrical shape arranged in the axis X and is provided with two annular flange parts 14 at upper and lower ends thereof. The flange parts 14 extend project radially inward at the upper and lower ends of the outer yoke 13, respectively, to contact the inner yoke 11. Namely, the flange parts 14 each have an inner diameter substantially the same as the outer diameter of the inner yoke 11. A cylindrical space is defined between the inner circumferential surface of an axially intermediate part of the outer yoke 13 and the outer circumferential surface of the inner yoke 11, and the coil 12 is disposed in this space.

Though not shown in the drawings, an inner circumferential surface of at least one of the upper and lower flange parts 14 is formed with an axially extending groove such that the lead wires of the coil 12 can be drawn out from an axial end surface of the outer yoke 13 through the groove.

The outer yoke 13 is divided into upper and lower parts at an axially intermediate position thereof or is constituted of a pair of vertically arranged cylindrical yoke members (hereinafter referred to as an upper outer yoke 41 and a lower outer yoke 42). The upper outer yoke 41 extends downward from the upper flange part 14 along the outer surface of the coil 12, and the lower outer yoke 42 extends upward from the lower flange part 14 along the outer surface of the coil 12. The lower end of the upper outer yoke 41 and the upper end of the lower outer yoke 42 oppose and are spaced from each other at a position corresponding to the axially intermediate part of the coil 12 to define an annular magnetic gap 18 in the outer yoke 13.

The lower end of the upper outer yoke 41 is formed with a pair of notches 19 (not shown in the drawings) at positions opposing each other via the axis X (at positions circumferentially apart from each other by 180 degrees). The upper end of the lower outer yoke 42 also is formed with a pair of notches 19 (not shown in the drawings) at positions opposing each other via the axis X (circumferentially apart from each other by 180 degrees) and circumferentially different from the positions of the pair of notches 19 of the upper outer yoke 41 (in this embodiment, the pair of notches 19 of the lower outer yoke 42 is circumferentially shifted from the pair of notches 19 of the upper outer yoke 41 by 90 degrees). These notches 19 constitute parts of the communication passage 35 and communicate the corresponding four liquid chambers 30 with the circumferential passage 36 formed by the magnetic gap 18.

The reinforcement member 21 is a member made of a non-magnetic material (preferably, a non-magnetic metal) having a permeability lower than that of the metal constituting the outer yoke 13 and serves to maintain the shape of the inner circumferential surface of the elastic member 8.

The reinforcement member 21 includes a cylindrical tubular portion 22 disposed along the axis X and an annular flange portion 23 provided on an axially intermediate part of the tubular portion 22. The flange portion 23 projects radially outward from the tubular portion 22. The tubular portion 22 of the reinforcement member 21 is provided in the inner peripheral portion of the elastic member 8 so as not to be exposed on the inner circumferential surface of the elastic member 8. The part of the tubular portion 22 between the upper two openings 25 and the lower two openings 25 forms an annular strip and extends vertically across the circumferential passage 36 of the communication passage 35 on an outer side of the circumferential passage 36 so as to radially oppose the circumferential passage 36.

The flange portion 23 of the reinforcement member 21 is embedded in the second wall 32 of the elastic member 8, and the tip end (outer peripheral edge) thereof is spaced from the inner circumferential surface of the outer tubular member 7. Therefore, the inner tubular member 6 and the reinforcement member 21 can move radially and axially relative to the outer tubular member 7 along with a deformation of the elastic member 8 and a volume change of the liquid chambers 30. The separation distance between the flange portion 23 and the outer tubular member 7 is larger than the separation distance between the tubular portion 22 and the inner tubular member 6. Therefore, the reinforcement member 21 axially moves substantially with the inner tubular member 6. The flange portion 23 of the reinforcement member 21 is provided in the inner peripheral portion of the second wall 32 and increases the bending stiffness of the inner peripheral portion of the second wall 32. Thus, the flange portion 23 serves as a reinforcement plate provided in the second wall 32 and forms a high bending stiffness portion 38 that extends radially in a part of the second wall 32.

Next, an operation of the variable stiffness bushing 1 regarding the second embodiment will be described. It is to be noted that the operation when the inner tubular member 6 is displaced relative to the outer tubular member 7 laterally or in the fore and aft direction are the same as that in the first embodiment, and thus, the description thereof will be omitted.

As shown in FIG. 11A, when the inner tubular member 6 is displaced upward relative to the outer tubular member 7, the upper and lower first walls 31 undergo elastic deformation to be inclined upward from the outer peripheral side toward the inner peripheral side at an inclination angle $\alpha$ in accordance with the amount of displacement (namely, the shape of each of the upper and lower first walls 31 changes from a disc-like shape to a frustoconical shape). On the other hand, since the second wall 32 is provided with the flange portion 23 in the inner peripheral portion thereof, the inner peripheral portion of the second wall 32 undergoes almost no deformation and only the portion thereof radially outward of the flange portion 23 undergoes elastic deformation to be inclined upward from the outer peripheral side toward the inner peripheral side. Thus, the inclination angle $\beta$ of the high bending stiffness portion 38 of the second wall 32 is smaller than the inclination angle $\alpha$ of the first walls 31, and the inclination angle $\gamma$ of the low bending stiffness portion of the second wall 32 which is radially outward of the high bending stiffness portion 38 is larger than the inclination angle $\alpha$ of the first walls 31.

As a result of the above deformation, the volume of each of the upper left liquid chamber 30A and the upper right liquid chamber 30B becomes smaller than that shown in FIG. 11B, while the volume of each of the lower front liquid chamber 30C and the lower rear liquid chamber 30D becomes larger than that shown in FIG. 11B. The volume of the upper left liquid chamber 30A and the upper right liquid chamber 30B and the volume of the lower front liquid chamber 30C and the lower rear liquid chamber 30D change in an inverse relationship to each other, and the amount of volume increase is the same as the amount of volume decrease. When the elastic member 8 undergoes deformation along with such a volume change of the liquid chambers 30, the magnetic fluid 37 flows through the communication passage 35.

Conversely, when the inner tubular member 6 is displaced downward relative to the outer tubular member 7, as shown in FIG. 11C, the upper and lower first walls 31 undergo elastic deformation to be inclined downward from the outer peripheral side toward the inner peripheral side at an inclination angle $\alpha$ in accordance with the amount of displacement. On the other hand, the second wall 32 undergoes almost no deformation in the inner peripheral portion thereof, and only the portion thereof radially outward of the flange portion 23 undergoes elastic deformation to be inclined downward from the outer peripheral side toward the inner peripheral side. In this case also, the inclination angle $\beta$ of the high bending stiffness portion 38 of the second wall 32 is smaller than the inclination angle $\alpha$ of the first walls 31, and inclination angle $\gamma$ of the low bending stiffness portion of the second wall 32 which is radially outward of the high bending stiffness portion 38 is larger than the inclination angle $\alpha$ of the first walls 31.

As a result of the above deformation, the volume of each of the upper left liquid chamber 30A and the upper right liquid chamber 30B becomes larger than that shown in FIG. 11B, while the volume of each of the lower front liquid chamber 30C and the lower rear liquid chamber 30D becomes smaller than that shown in FIG. 11B. When the elastic member 8 undergoes deformation with such a volume change of the liquid chambers 30, the magnetic fluid 37 flows through the communication passage 35.

When the magnetic fluid 37 flows through the communication passage 35, if a voltage is applied to the ends of the copper wire to supply electric current to the coil 12, a magnetic field is generated around the coil 12. The inner yoke 11, the upper outer yoke 41, and the lower outer yoke 42 of the inner tubular member 6 jointly form a magnetic circuit, and the magnetic field is concentrated in the circumferential passage 36 of the communication passage 35.

The variable stiffness bushing 1 according to the second embodiment can provide advantages similar to those provided in the first embodiment. Namely, the application of the magnetic field to the circumferential passage 36 increases the viscosity of the magnetic fluid 37 in the communication passage 35. Consequently, the resistance applied to the magnetic fluid 37 flowing through the communication passage 35 increases, and therefore, the damping force for damping the vibration acting on the variable stiffness bushing 1 increases. In addition, the increase in the resistance applied to the magnetic fluid 37 flowing through the communication passage 35 makes the inner tubular member 6 less easy to move relative to the outer tubular member 7, whereby the stiffness of the variable stiffness bushing 1 increases. Thus, it is possible to control the damping force for damping the vibration of the variable stiffness bushing 1 by controlling the voltage applied to the coil 12.

Third Embodiment

Next, with reference to FIGS. 12 and 13, a variable stiffness bushing 1 according to the third embodiment of the invention will be described. It is to be noted that the elements similar or the same in form or function as those of the first embodiment will be denoted by the same reference numerals and a duplicated description thereof will be omitted.

Figure 12:
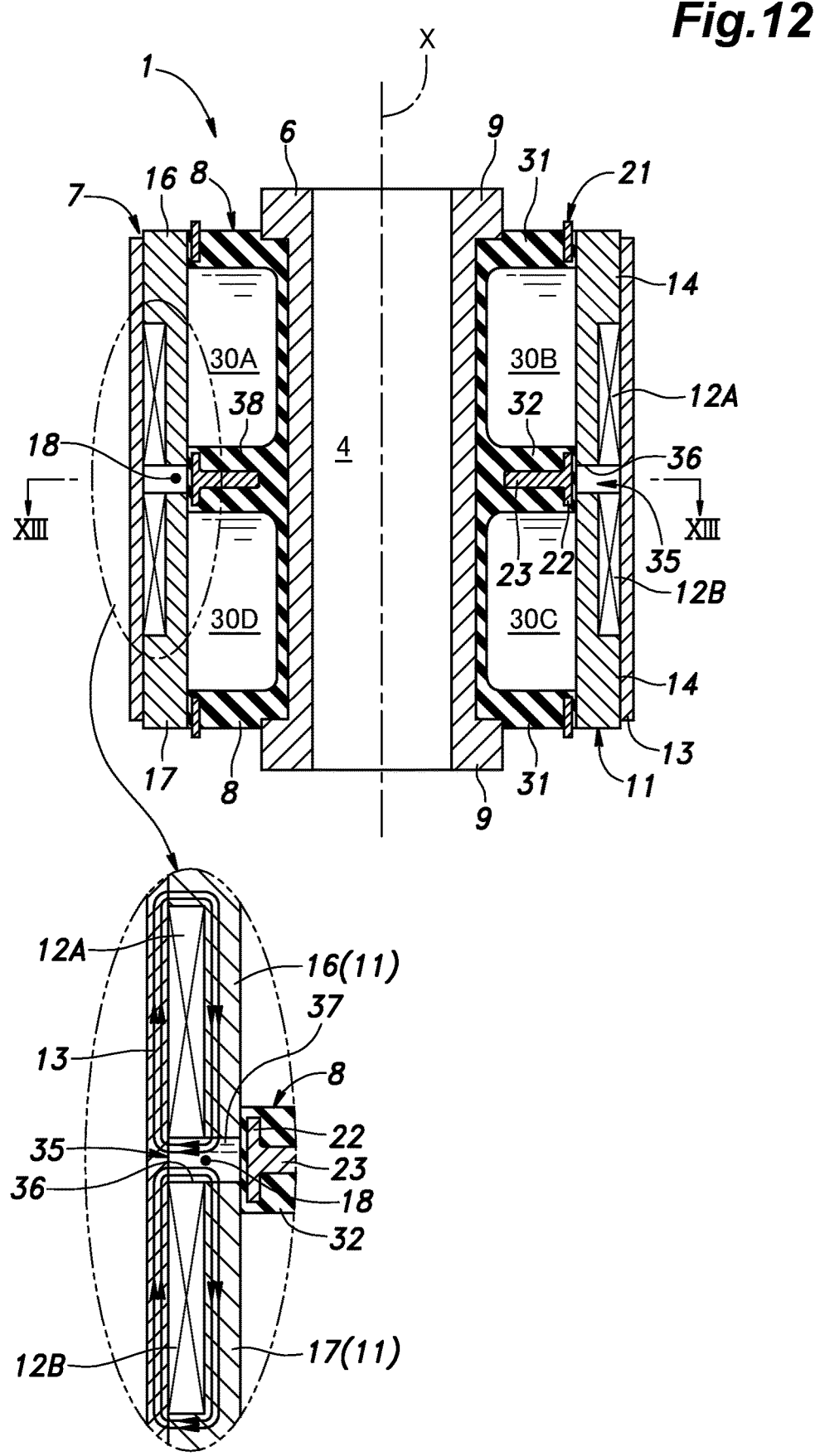
FIG. 12 is a sectional view similar to FIG. 7 and showing a variable stiffness bushing according to the third embodiment.
Figure 13:
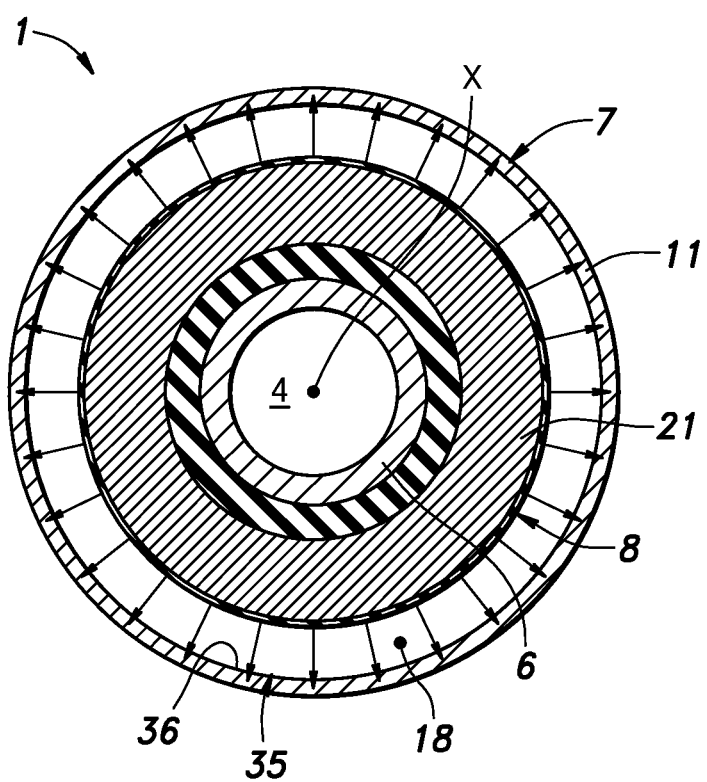
FIG. 13 is a sectional view taken along line XIII-XIII in FIG. 12.

FIG. 12 is a sectional view similar to FIG. 7 and showing the variable stiffness bushing 1 according to the third embodiment. As shown in FIG. 12, in the variable stiffness bushing 1 of the third embodiment, the coil 12 is divided into upper and lower parts at an axially intermediate position thereof or is constituted of a pair of vertically arranged cylindrical coils 12 (an upper first coil 12A and a lower second coil 12B). A gap is formed between the first coil 12A and the second coil 12B, and this gap cooperates with the gap formed between the upper inner yoke 16 and the lower inner yoke 17 (the magnetic gap 18) to constitute the circumferential passage 36 of the communication passage 35.

The first coil 12A and the second coil 12B are configured to generate magnetic fields in mutually opposing directions. The first coil 12A and the second coil 12B are constituted of two respective copper wires that are not electrically connected to each other. The two end portions of the first coil 12A and the two end portions of the second coil 12B are drawn out from the outer tubular member 7 as lead wires. Electric current is supplied to the first coil 12A and the second coil 12B simultaneously via the respective pairs of the lead wires. Alternatively, the first coil 12A and the second coil 12B may be constituted of a single copper wire and be electrically connected to each other so long as the copper wire is wound in different directions for the first coil 12A and the second coil 12B. In this case, the two ends of the single copper wire constituting the first and second coils 12A and 12B are drawn out from the outer tubular member 7 as lead wires.

When electric current flows through the first coil 12A and the second coil 12B, the first coil 12A and the second coil 12B generate magnetic fields in mutually opposing directions. In the partial enlarged view of FIG. 12 and in FIG. 13, magnetic field lines corresponding to the magnetic fields generated by the coils 12 are indicated by arrows. The outer yoke 13, the upper inner yoke 16, and the lower inner yoke 17 of the outer tubular member 7 jointly form a magnetic circuit, and the magnetic field is concentrated in the circumferential passage 36 of the communication passage 35. Namely, the gap formed between the first coil 12A and the second coil 12B also serves as the magnetic gap 18.

In another embodiment, the upper inner yoke 16 and the lower inner yoke 17 do not have to form the gap constituting the circumferential passage 36 therebetween, and may be formed with only the notches 19 for communicating the communication passage 35 with the respective liquid chambers 30. In this case, the circumferential passage 36 of the communication passage 35 (namely, the magnetic gap 18) is formed by only the gap defined between the first coil 12A and the second coil 12B.

The application of the magnetic field to the circumferential passage 36 increases the viscosity of the magnetic fluid 37 in the communication passage 35. Consequently, the resistance applied to the magnetic fluid 37 flowing through the communication passage 35 increases, and therefore, the damping force for damping the vibration acting on the variable stiffness bushing 1 increases. In addition, the increase in the resistance applied to the magnetic fluid 37 flowing through the communication passage 35 makes the inner tubular member 6 less easy to move relative to the outer tubular member 7, whereby the stiffness of the variable stiffness bushing 1 increases. Thus, it is possible to control the damping force for damping the vibration of the variable stiffness bushing 1 by controlling the voltage applied to the coil 12.

The variable stiffness bushing 1 according to the third embodiment can provide advantages similar to those provided by the first embodiment. In addition, in the variable stiffness bushing 1 according to the third embodiment, the coil 12 is constituted of the first coil 12A and the second coil 12B that are arranged to be axially spaced from each other at a position corresponding to the circumferential passage 36 with respect to the axial direction and to generate magnetic fields in mutually opposing directions. Thereby, the magnetic field lines generated by the first coil 12A and the second coil 12B are all concentrated between the first coil 12A and the second coil 12B, whereby it is ensured that the magnetic field is applied to the circumferential passage 36 formed in this position.

Fourth Embodiment

Next, with reference to FIG. 14, a variable stiffness bushing 1 according to the fourth embodiment of the invention will be described. It is to be noted that the elements similar or the same in form or function as those of the first embodiment will be denoted by the same reference numerals and a duplicated description thereof will be omitted.

Figure 14:
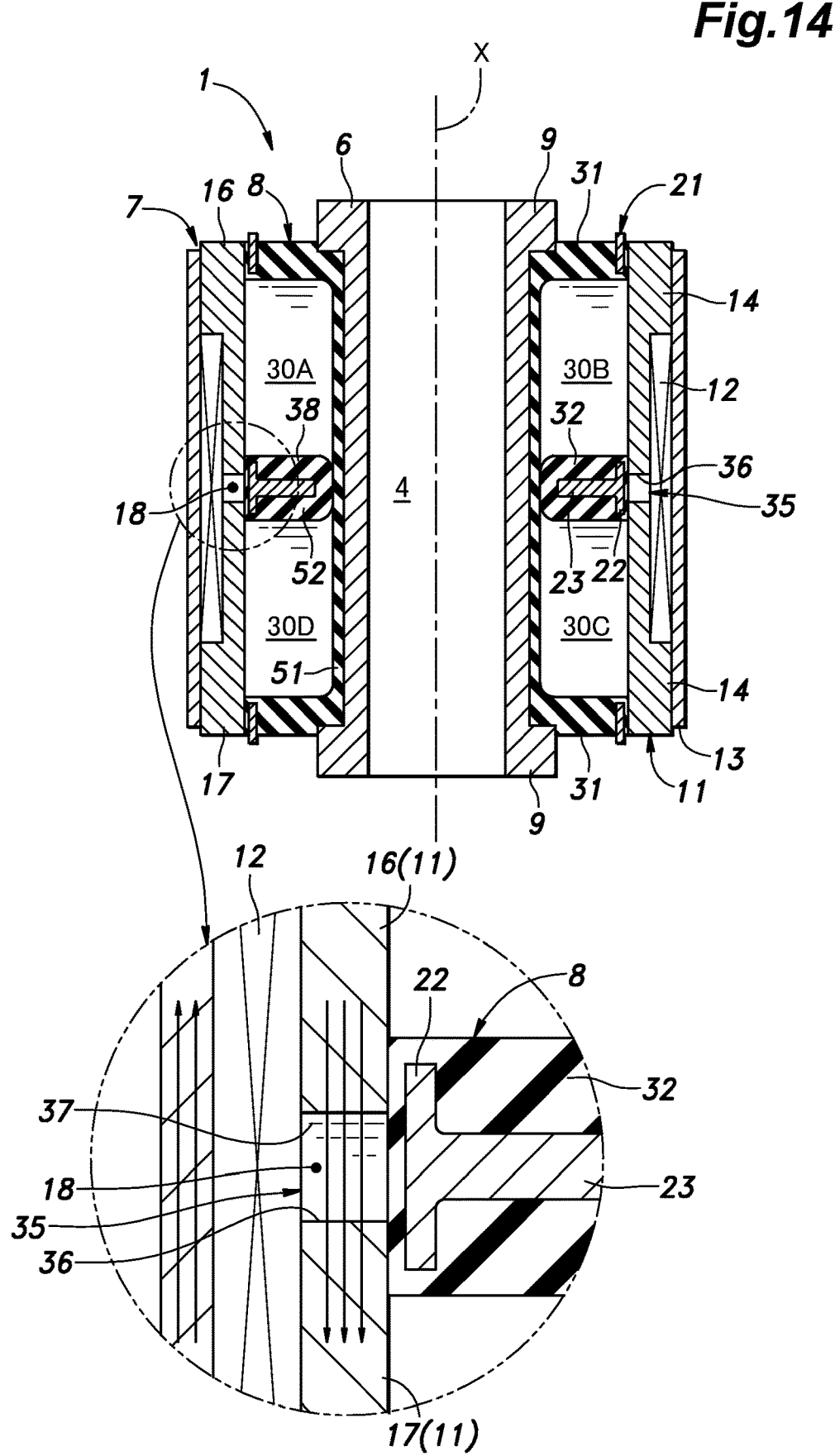
FIG. 14 is a sectional view similar to FIG. 7 and showing a variable stiffness bushing according to the fourth embodiment.

FIG. 14 is a sectional view similar to FIG. 7 and showing a variable stiffness bushing 1 according to the fourth embodiment of the invention. As shown in FIG. 14, in the variable stiffness bushing 1 of the fourth embodiment, the second wall 32 of the elastic member 8 is formed as a separate member from the upper and lower first walls 31. Specifically, the upper and lower first walls 31 are formed integrally with a cylindrical portion 51 of the elastic member 8 surrounding the outer circumferential surface of the inner tubular member 6. On the other hand, the second wall 32 is in elastic contact with the outer circumferential surface of the cylindrical portion 51 of the elastic member 8 and is axially movable relative to the cylindrical portion 51. In the second wall 32 is embedded the flange portion 23 of the reinforcement member 21, which moves substantially with the outer tubular member 7.

When the inner tubular member 6 is displaced upward relative to the outer tubular member 7, the upper and lower first walls 31 undergo elastic deformation to be inclined at an inclination angle α in accordance with the amount of displacement. On the other hand, since the second wall 32 is provided with the flange portion 23 in the outer peripheral portion thereof and is formed as a separate member from the cylindrical portion 51, the outer peripheral portion of the second wall 32 undergoes almost no deformation and the inner circumferential surface of the second wall 32 slides relative to the cylindrical portion 51. In other words, the second wall 32 constitutes a piston 52 fixed to the outer tubular member 7 and slidable relative to the inner tubular member 6.

In the variable stiffness bushing 1 configured as above, the volume difference created between the axially separated liquid chambers 30 upon an axial displacement between the inner tubular member 6 and the outer tubular member 7 is increased for a given amount of axial displacement, whereby the rate of change of the axial stiffness of the variable stiffness bushing 1 is increased.

In the following, exemplary uses of the above-described variable stiffness bushing 1 will be described.

Figure 15:
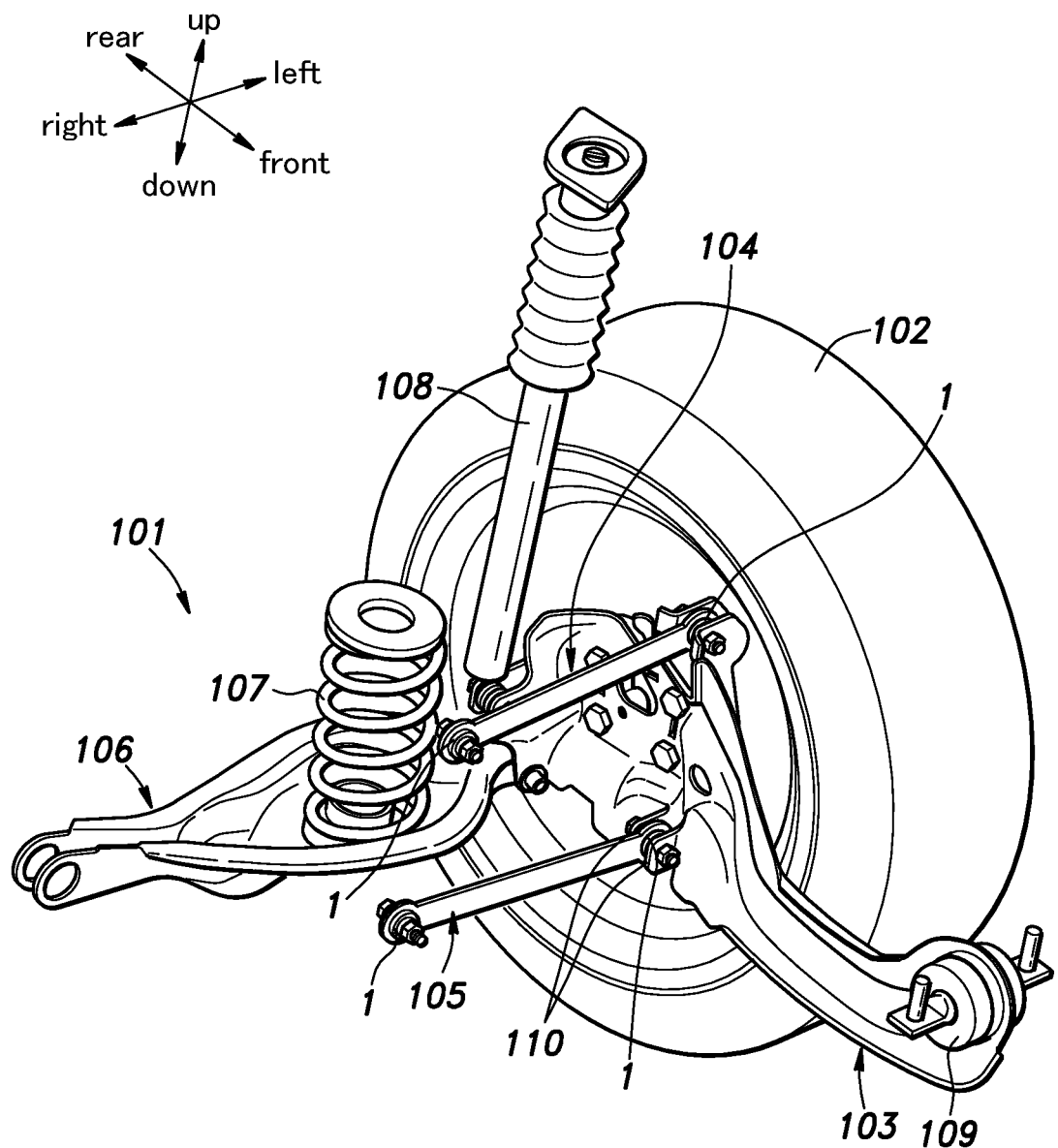
FIG. 15 is an explanatory diagram showing an exemplary use of the variable stiffness bushing.

FIG. 15 shows an example in which the variable stiffness bushing 1 shown in the foregoing embodiments is used in the suspension 101 of an automobile. This suspension 101 is a rear suspension configured to support a left rear wheel 102 and consists of an independent suspension (more specifically, a double wishbone suspension). As shown in FIG. 15, the suspension 101 includes a trailing arm 103, an upper arm 104, a first lower arm 105, a second lower arm 106, a spring 107, and a damper 108.

The trailing arm 103 is a member extending in the fore and aft direction and has a front end pivotally supported by the vehicle body 112 (see FIG. 16) via a bushing 109. The left rear wheel 102 is rotatably supported at the rear end of the trailing arm 103.

The first lower arm 105 is a sheet metal member extending substantially in the vehicle width direction and has an outboard end pivotally connected to the trailing arm 103. The trailing arm 103 is provided with a pair of plate-shaped supports 110 arranged to be spaced in the fore and aft direction, and each support 110 is formed with a through-hole passing therethrough substantially in the fore and aft direction. The outboard end of the first lower arm 105 is fitted with a variable stiffness bushing 1 and a bolt passed through the bolt insertion hole 4 of the variable stiffness bushing 1 is passed through and fastened to the through-holes of the supports 110 of the trailing arm 103, whereby the outboard end of the first lower arm 105 is pivotally connected to the trailing arm 103 via the variable stiffness bushing 1. The inboard end of the first lower arm 105 is pivotally connected to the vehicle body 112 via another variable stiffness bushing 1 in a similar manner.

The second lower arm 106 is a member extending substantially in the vehicle width direction and has an outboard end pivotally connected to the trailing arm 103 and an inboard end pivotally connected to the vehicle body 112. The vehicle body 112 has a part located above the second lower arm 106, and the spring 107 is interposed between the vehicle body 112 and the second lower arm 106. The damper 108 has a lower end pivotally connected to the second lower arm 106 and an upper end supported by the vehicle body 112. The spring 107 and the damper 108 function as a shock absorber for absorbing vibrations transmitted from the road surface to the vehicle body 112.

Similarly to the first lower arm 105, the upper arm 104 is a member extending substantially in the vehicle width direction and has an outboard end pivotally connected to the second lower arm 106 via a variable stiffness bushing 1 and an inboard end pivotally connected to the vehicle body 112 via another variable stiffness bushing 1 in a similar manner as in the first lower arm 105. These variable stiffness bushings 1 may each be realized by any of the variable stiffness bushings 1 shown in the foregoing embodiments.

Figure 16:
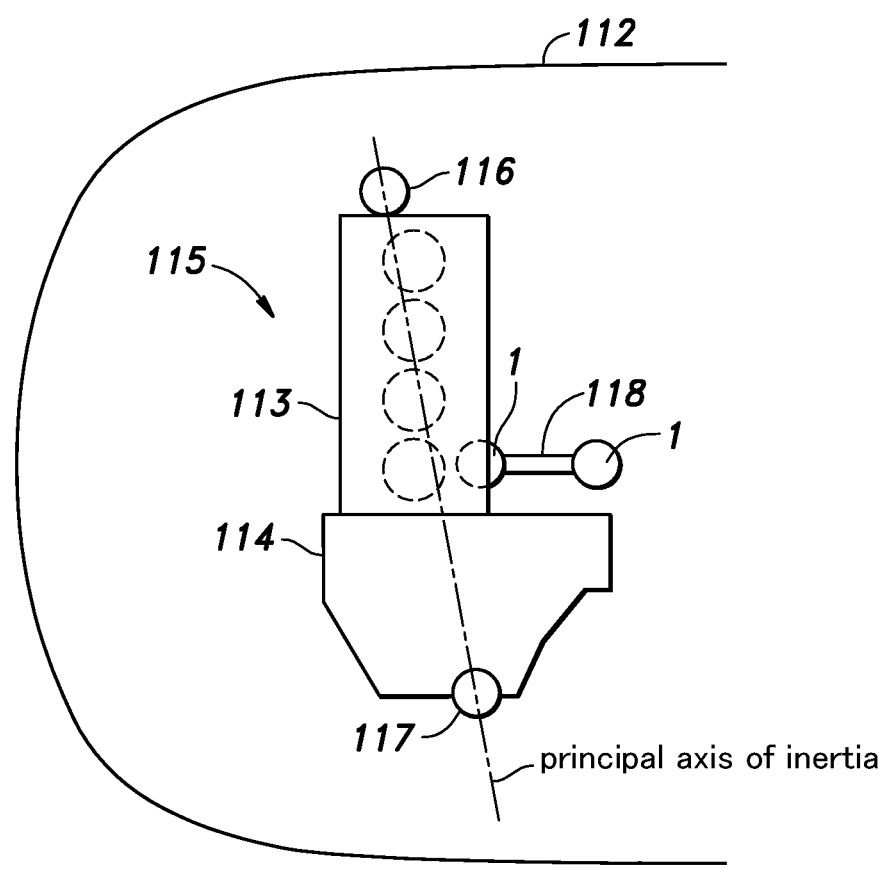
FIG. 16 is an explanatory diagram showing another exemplary use of the variable stiffness bushing.

FIG. 16 shows an example in which the variable stiffness bushing 1 shown in the foregoing embodiments is used in an engine support of an automobile. An engine 113 is placed in a front part of the vehicle body 112 of the automobile in a transverse position. The engine 113 is integrally provided with a transmission 114, and the engine 113 and the transmission 114 form a power plant 115. The power plant 115 is supported by the vehicle body 112 via two engine mounts 116, 117 (a side mount and a trans mount) and a torque rod 118.

The two engine mounts 116, 117 are configured to support the main load (own weight) of the power plant 115 and are located on the principal axis of inertia of the whole power plant 115. On the other hand, the torque rod 118 is connected to the engine 113 on one longitudinal end thereof and to the vehicle body 112 on another longitudinal end thereof. It is to be noted here that, with only the two engine mounts 116, 117, the power plant 115 may roll about a roll axis (principal axis of inertia) due to the driving torque of the engine 113, but the torque rod 118 prevents the rolling of the power plant 115. Each end of the torque rod 118 is provided with a variable stiffness bushing 1, which may be realized by any of the variable stiffness bushings 1 shown in the foregoing embodiments.

Further, other than the suspension 101 and the engine support where the vibrations are generated in the automobile, the variable stiffness bushing 1 may be used in various portions/places where vibrations may be generated, such as in a motor support. The variable stiffness bushing 1 may be used even in portions of devices other than automobiles where vibrations may be generated.

The present invention has been described in the foregoing with respect to the concrete embodiments thereof, but various modifications and alterations of the present invention are possible without being limited by the foregoing embodiments. For instance, in the foregoing embodiments, the entirety of the outer tubular member 7 or the inner tubular member 6 constitutes a yoke, but it is only necessary that the yoke is included in the outer tubular member 7 or the inner tubular member 6, and the outer tubular member 7 or the inner tubular member 6 may include a part made of a metal having a low permeability.

Besides, the concrete structure, arrangement, number, angle, material, etc. of the components of the foregoing embodiments may be appropriately changed within the scope of the present invention. Also, not all of the structural elements shown in the above embodiments are necessarily indispensable and they may be selectively adopted as appropriate. The structures of the foregoing embodiments may be combined as appropriate.

The invention claimed is:

1. A variable stiffness bushing, comprising:
an inner tubular member;
an outer tubular member disposed coaxially around the inner tubular member with a prescribed gap defined between the outer tubular member and the inner tubular member;
a tubular elastic member connecting the inner tubular member and the outer tubular member;
at least one pair of liquid chambers defined in the elastic member so as to be axially separated from each other;
a communication passage including a circumferential passage provided in one of the inner tubular member and the outer tubular member and extending in a circumferential direction, the communication passage communicating the at least one pair of liquid chambers with one another;
a coil wound coaxially with and provided in the one of the inner tubular member and the outer tubular member;
a yoke included in the one of the inner tubular member and the outer tubular member and provided with a gap constituting the circumferential passage; and
a magnetic fluid filling the at least one pair of liquid chambers and the communication passage,
wherein the elastic member includes a pair of first walls defining axially opposite ends of the at least one pair of liquid chambers and a second wall defining axially facing ends of the at least one pair of liquid chambers, and
the pair of first walls and the second wall are configured such that when the inner tubular member and the outer tubular member are axially displaced relative to each other, a difference is created between volumes of the at least one pair of liquid chambers.

2. The variable stiffness bushing according to claim 1, wherein the pair of first walls and the second wall are configured such that when the inner tubular member and the outer tubular member are axially displaced relative to each other, an inclination angle of at least a part of the second wall becomes smaller than an inclination angle of each first wall of the pair of first walls.

3. The variable stiffness bushing according to claim 1, wherein the second wall includes a high bending stiffness portion extending radially over a part of the second wall.

4. The variable stiffness bushing according to claim 3, wherein the high bending stiffness portion includes a reinforcement member provided in/on the second wall.

5. The variable stiffness bushing according to claim 4, wherein the reinforcement member is embedded in the second wall so as to be axially movable together with the one of the inner tubular member and the outer tubular member, and the reinforcement member includes an annular part disposed to extend across the circumferential passage as viewed in a radial direction and a flange portion extending from the annular part in a direction away from the circumferential passage and having a tip end spaced from another of the inner tubular member and the outer tubular member.

6. The variable stiffness bushing according to claim 4, wherein the reinforcement member is at least partially embedded in the elastic member and is not in contact with the yoke.

7. The variable stiffness bushing according to claim 4, wherein the reinforcement member is made of a non-magnetic material.

8. The variable stiffness bushing according to claim 1, wherein the second wall constitutes a piston fixed to the one of the inner tubular member and the outer tubular member and slidable relative to another of the inner tubular member and the outer tubular member.

9. The variable stiffness bushing according to claim 1, wherein the coil is constituted of a first coil and a second coil that are arranged to be axially spaced from each other at a position corresponding to the circumferential passage with respect to an axial direction and are configured to generate magnetic fields in mutually opposing directions.

10. The variable stiffness bushing according to claim 1, wherein the at least one pair of liquid chambers includes two liquid chambers opposing each other in a first radial direction on one side with respect to an axial direction and two liquid chambers opposing each other in a second radial direction orthogonal to the first radial direction on another side with respect to the axial direction, and the four liquid chambers are in communication with the circumferential passage.

* * * * *